(12) United States Patent
Yuasa et al.

(10) Patent No.: US 7,662,884 B2
(45) Date of Patent: Feb. 16, 2010

(54) CEMENT ADMIXTURE AND PRODUCTION METHOD THEREOF

(75) Inventors: Tsutomu Yuasa, Osaka (JP); Hiromichi Tanaka, Yokohama (JP); Noboru Sakamoto, Takatsuki (JP); Tomotaka Nishikawa, Takatsuki (JP); Hiroko Izukashi, Osaka (JP); Toru Uno, Yokohama (JP); Tsuyoshi Hirata, Kobe (JP); Tomiyasu Ueta, Suita (JP); Yoshiyuki Onda, Tokyo (JP)

(73) Assignee: Nippon Shokubai Co., Ltd., Osaka (JP)

( * ) Notice: Subject to any disclaimer, the term of this patent is extended or adjusted under 35 U.S.C. 154(b) by 20 days.

(21) Appl. No.: 10/479,298

(22) PCT Filed: Apr. 23, 2003

(86) PCT No.: PCT/JP03/05141

§ 371 (c)(1),
(2), (4) Date: Feb. 10, 2004

(87) PCT Pub. No.: WO03/091180

PCT Pub. Date: Nov. 6, 2003

(65) Prior Publication Data

US 2004/0260011 A1    Dec. 23, 2004

(30) Foreign Application Priority Data

Apr. 25, 2002 (JP) ............... 2002-124579
Apr. 25, 2002 (JP) ............... 2002-124580
May 20, 2002 (JP) ............... 2002-144937
Feb. 26, 2003 (JP) ............... 2003-049887

(51) Int. Cl.
*C08L 79/02* (2006.01)
*C08L 71/02* (2006.01)
*C04B 24/26* (2006.01)
*C04B 24/12* (2006.01)
*C08F 290/06* (2006.01)

(52) U.S. Cl. .............. 525/180; 525/178; 525/182; 525/187

(58) Field of Classification Search ............... 525/178, 525/180, 182, 187
See application file for complete search history.

(56) References Cited

U.S. PATENT DOCUMENTS

| | | | |
|---|---|---|---|
| 4,471,100 A | 9/1984 | Tsubakimoto et al. | |
| 4,808,641 A | 2/1989 | Yagi et al. | |
| 4,870,120 A | 9/1989 | Tsubakimoto et al. | |
| 4,936,918 A | 6/1990 | Furuhashi et al. | |
| 5,087,648 A | 2/1992 | Kinoshita et al. | |
| 5,223,036 A | 6/1993 | Koyata et al. | |
| 5,290,869 A | 3/1994 | Kinoshita et al. | |
| 5,466,289 A | 11/1995 | Yonezawa et al. | |
| 5,880,182 A | 3/1999 | Minomiya et al. | |
| 6,462,110 B2 | 10/2002 | Satoh et al. | |
| 6,680,348 B1 | 1/2004 | Amaya et al. | |
| 2002/0193547 A1 | 12/2002 | Yuasa et al. | |
| 2003/0087993 A1 | 5/2003 | Nishikawa et al. | |
| 2005/0131110 A1 | 6/2005 | Yuasa et al. | |

FOREIGN PATENT DOCUMENTS

| | | |
|---|---|---|
| EP | 0 619 277 A1 | 10/1994 |
| EP | 619277 A1 | 10/1994 |
| EP | 1 184 353 A1 | 3/2002 |
| EP | 1184353 A1 | 3/2002 |
| JP | HEI 9-39239 | 4/1976 |
| JP | 58-38380 B2 | 8/1983 |
| JP | 59-18338 B2 | 4/1984 |
| JP | 06-271347 A | 9/1984 |
| JP | 62-068806 A | 3/1987 |
| JP | 62-119147 A | 5/1987 |
| JP | 62-216950 A | 9/1987 |
| JP | 63-11557 A | 1/1988 |
| JP | 01-113419 A | 5/1989 |
| JP | 01-226757 A | 9/1989 |
| JP | 04-149056 A | 5/1992 |
| JP | 05-043288 A | 2/1993 |
| JP | 5-36377 B2 | 5/1993 |
| JP | 05-170501 A | 7/1993 |

(Continued)

OTHER PUBLICATIONS

Computer translation of JP 3235002.

(Continued)

*Primary Examiner*—Ana L Woodward
(74) *Attorney, Agent, or Firm*—Sughrue Mion, PLLC

(57) ABSTRACT

It is an object of the present invention, which has been made in view of the above-mentioned state of the art, to provide a cement admixture capable of improving the water-reducing ability of cement compositions and the like and enhancing the strength and durability of hardened products produced therefrom and further capable of adjusting the viscosity of such compositions so as to facilitate the works at the sites of handling the same, as well as a method of producing such cement additive.

A cement admixture comprising a polycarboxylic acid polymer and a nitrogen atom-containing compound having non-amide bond, wherein the mass ratio (A/B) between the mass (A) of said polycarboxylic acid polymer and the mass (B) of said nitrogen atom-containing compound having non-amide bond satisfies the relation 200>(A/B)>1.

7 Claims, No Drawings

FOREIGN PATENT DOCUMENTS

| | | | |
|---|---|---|---|
| JP | 6-171996 A | | 6/1994 |
| JP | 06-191918 A | | 7/1994 |
| JP | 06-220395 | * | 8/1994 |
| JP | 06-298555 A | | 10/1994 |
| JP | 07-232945 | * | 5/1995 |
| JP | 7-172889 A | | 7/1995 |
| JP | 7-232945 A | | 9/1995 |
| JP | 07-267705 A | | 10/1995 |
| JP | 2508113 B2 | | 4/1996 |
| JP | 08109055 A | | 4/1996 |
| JP | 8-165157 A | | 6/1996 |
| JP | 2000-063164 | | 2/2000 |
| JP | 2000-63165 A | | 2/2000 |
| JP | 2000-109357 | * | 4/2000 |
| JP | 2000-191356 | | 7/2000 |
| JP | 2001-048619 A | | 2/2001 |
| JP | 2001-48619 A | | 2/2001 |
| JP | 2001-172068 A | | 6/2001 |
| JP | 2001-180998 A | | 7/2001 |
| JP | 2001-294466 A | | 10/2001 |
| JP | 3235002 | | 12/2001 |
| JP | 2000-63164 A | | 2/2002 |
| JP | 2002-053359 A | | 2/2002 |
| JP | 2002-121056 A | | 4/2002 |
| JP | 2002-121057 A | | 4/2002 |
| JP | 2002-191356 A | | 7/2002 |
| JP | 2002-201240 A | | 7/2002 |
| JP | 2004-043280 A | | 2/2004 |
| JP | 2004-043284 A | | 2/2004 |
| JP | 2007-277575 | | 10/2007 |
| WO | WO 02053611 A1 | | 7/2002 |

OTHER PUBLICATIONS

Certified experiment results.

* cited by examiner

CEMENT ADMIXTURE AND PRODUCTION METHOD THEREOF

TECHNICAL FIELD

The present invention relates to a cement admixture and a method of producing the same. More particularly, it relates to a cement admixture capable of exhibiting high water-reducing performance and, further, of providing cement compositions easy to handle, and to a method of producing the same.

BACKGROUND ART

Cement admixtures comprising polycarboxylic acid polymers have been widely used for cement compositions such as cement paste, mortar, and concrete. They are now essential in constructing civil engineering and building structures and the like from cement compositions. Such cement admixtures are used as water reducing agents; they increase the fluidity of cement compositions to thereby reduce the water requirement of the cement compositions and therefore are effective in improving the strength, durability, and the like, of hardening products. Such water reducing agents are superior in water-reducing performance to naphthalene and other conventional water reducing agents and thus have already led to good results in many cases as air-entraining and high-range water-reducing admixture.

Meanwhile, cement admixtures are required to be able not only to show water-reducing performance in such cement compositions but also to improve cement compositions in viscosity to thereby facilitate the works at the sites of handling them. Thus, while cement additives used as water reducing agents show their water-reducing performance by reducing the viscosity of cement compositions, they are required at the sites of civil engineering and building structure construction not only to be able to show their performance to reduce the viscosity of cement compositions but also to provide a viscosity in such the level that the works will be facilitated at the sites of handling them. If a cement admixture can exhibit such performance characteristics, it will improve the working efficiency in civil engineering and building structure construction.

Japanese Kokai Publication 2000-191356 discloses that a cement dispersant whose main component is a water-soluble amphoteric copolymer obtained by copolymerization of a specific polyamine-derived monomer as compound A, a specific unsaturated carboxylic acid monomer as compound B and a specific polyalkylene glycol-derived monomer as compound C in the proportion of compound A: compound B: compound C=10 to 40% by mass : 10 to 40% by mass: 50 to 80% by mass can be used as a dispersant for ultrahigh strength concrete and that it is excellent in field workability.

However, water-soluble amphoteric copolymers prepared in all Examples in this publication by copolymerizing compound A, compound B and compound C, when used in preparing high strength concrete, provide them with high viscosity, making the shovel work difficult; thus, they have a workability problem. Therefore, there was room for contrivance in order to be able to applied to various cement compositions and the like suitably, in addition, to provide such a level of viscosity as facilitating the works on the sites of handling them.

SUMMARY OF THE INVENTION

It is an object of the present invention, which has been made in view of the above-mentioned state of the art, to provide a cement admixture capable of improving the water-reducing ability of cement compositions and the like and enhancing the strength and durability of hardening products produced therefrom and further capable of adjusting the viscosity of such compositions so as to facilitate the works at the sites of handling the same, as well as a method of producing such cement additive.

In the course of investigations made by them in search of cement admixtures excellent in water-reducing ability and workability improvement, the present inventors first paid attention to the fact that polycarboxylic acid polymers can exhibit water-reducing performance characteristics in cement compositions and the like, and they found that the use of nitrogen atom-containing compound having non-amide bond in combination with a polycarboxylic acid polymer is effective in improving the viscosity of cement compositions and the like. Thus, they found that the above problems can successfully be solved when a polycarboxylic acid polymer and nitrogen atom-containing compound having non-amide bond are used in combination, or when two or more species of polycarboxylic acid polymers and nitrogen atom-containing compound having non-amide bond are used in combination, or when two or more species of polycarboxylic acid polymers including a polycarboxylic acid polymer resulting from copolymerization using a nitrogen atom-containing monomer and nitrogen atom-containing compound having non-amide bond are used in combination, or when a polycarboxylic acid polymer composition comprising a polycarboxylic acid polymer resulting from copolymerization using a nitrogen atom-containing monomer, and a polycarboxylic acid polymer other than the polycarboxylic acid polymer just mentioned above is used in combination with a nitrogen atom-containing compound having non-amide bond, or when a polycarboxylic acid polymer composition comprising a polycarboxylic acid polymer resulting from copolymerization using a nitrogen atom-containing monomer, and two or more species of polycarboxylic acid polymers other than the polycarboxylic acid polymer just mentioned above, namely three or more species of polycarboxylic acid polymers, is used in combination with nitrogen atom-containing compound having non-amide bond, or when a polycarboxylic acid polymer composition comprising a combination of two or more species of polycarboxylic acid polymers other than the polycarboxylic acid polymers resulting from copolymerization using nitrogen atom-containing monomer having non-amide bond, and a polycarboxylic acid polymer resulting from copolymerization using a nitrogen atom-containing monomer having non-amide bond, namely a combination of three or more species of polycarboxylic acid polymers, is used.

Further, they found that the use of a polyhydric alcohol-alkylene oxide adduct in combination with a polycarboxylic acid polymer is effective and that the same effects as mentioned above can be produced and the above problems can successfully be solved as well when a polycarboxylic acid polymer and a polyhydric alcohol-alkylene oxide adduct are used in combination, or when a polycarboxylic acid polymer resulting from copolymerization using a polyhydric alcohol-alkylene oxide adduct monomer is used in combination with a polyhydric alcohol-alkylene oxide adduct, or when a polycarboxylic acid polymer resulting from copolymerization using a polyhydric alcohol-alkylene oxide adduct monomer is used in combination with another polycarboxylic acid polymer.

Furthermore, they found that the use of a polyamide-polyamine compound, which is a nitrogen atom-containing compound, in combination with a polycarboxylic acid polymer is effective and that the same effects as mentioned above can be produced and the above problems can successfully be solved when a polycarboxylic acid polymer is used in combination with a specific amount of a polyamidepolyamine, or when a specific amount of a polycarboxylic acid polymer resulting from copolymerization using a polyamidepolyamine monomer is used in combination with a polyamidepolyamine, or when a specific amount of a polycarboxylic acid polymer resulting from copolymerization using a polyamidepolyamine monomer is used in combination with another polycarboxylic acid polymers.

Thus, the present invention is concerned with a cement admixture or a method of producing a cement admixture as defined below under any of (1) to (13). These are all effective in preparing concrete compositions in good condition. The term "concrete compositions in good condition" means that the concrete compositions have such a viscosity as facilitating the works at the sites of handling cement compositions and the like and feel moist and smooth.

(1) A cement admixture comprising a polycarboxylic acid polymer and a nitrogen atom-containing compound having non-amide bond, wherein the mass ratio (A/B) between the mass (A) of said polycarboxylic acid polymer and the mass (B) of said nitrogen atom-containing compound having non-amide bond satisfies the relation 200>(A/B)>1.

(2) A cement admixture comprising a polycarboxylic acid polymer and a nitrogen atom-containing compound having non-amide bond, wherein said polycarboxylic acid polymer has a moiety represented by the following general formula (1):

$$-O-(R^aO)_r-R^1 \quad (1)$$

in the formula, $R^1$ represents a hydrogen atom or a hydrocarbon group containing 1 to 20 carbon atoms, $R^a$ may be the same or different and each represents an alkylene group containing 2 to 18 carbon atoms, and r represents the average molar number of addition of the oxyalkylene group represented by $R^aO$ and is a number of 40 to 300.

(3) A cement admixture comprising two or more species of polycarboxylic acid polymers and a nitrogen atom-containing compound having non-amide bond.

(4) A cement admixture comprising two or more species of polycarboxylic acid polymers other than a polycarboxylic acid polymer resulting from copolymerization using a nitrogen atom-containing monomer having non-amide bond, and the polycarboxylic acid polymer resulting from copolymerization using a nitrogen atom-containing monomer having non-amide bond.

(5) A cement admixture comprising a polycarboxylic acid polymer and a polyhydric alcohol-alkylene oxide adduct.

(6) A cement admixture comprising a polycarboxylic acid polymer and a polyhydric alcohol-alkylene oxide adduct, wherein said polycarboxylic acid polymer comprises a polycarboxylic acid polymer resulting from copolymerization using a polyhydric alcohol-alkylene oxide adduct monomer.

(7) A cement admixture comprising a polycarboxylic acid polymer resulting from copolymerization using a polyhydric alcohol-alkylene oxide adduct monomer and a polycarboxylic acid polymer other than said polymer.

(8) A cement admixture comprising a polycarboxylic acid polymer and a polyamidepolyamine, wherein said cement admixture comprises not less than 16% by mass of said polyamidepolyamine relative to 100% by mass of the solid matter in said cement admixture.

(9) A cement admixture comprising a polycarboxylic acid polymer and a polyamidepolyamine, wherein said polycarboxylic acid polymer comprises a polycarboxylic acid polymer resulting from copolymerization using a polyamidepolyamine monomer, said cement admixture comprising not less than 13% by mass of said polycarboxylic acid polymer resulting from copolymerization using a polyamidepolyamine monomer relative to 100% by mass of the solid matter in said cement admixture.

(10) A cement admixture comprising a polycarboxylic acid polymer resulting from copolymerization using a polyamidepolyamine monomer and a polycarboxylic acid polymer other than said polymer, said cement admixture comprising not less than 13% by mass of said polycarboxylic acid polymer resulting from copolymerization using a polyamidepolyamine monomer relative to 100% by mass of the solid matter in said cement admixture.

(11) A method of producing a cement admixture comprising one or two or more species of polycarboxylic acid polymers and a polyhydric alcohol-alkylene oxide adduct which comprises a step of mixing the polycarboxylic acid polymer or polymers with the polyhydric alcohol-alkylene oxide adduct.

(12) A method of producing a cement admixture comprising two or more species of polycarboxylic acid polymers which comprises a step of mixing polycarboxylic acid polymers with a polycarboxylic acid polymer resulting from copolymerization using a polyhydric alcohol-alkylene oxide adduct monomer.

(13) A method of producing cement admixtures comprising one or two or more species of polycarboxylic acid polymers and a polyamidepolyamine and/or a polycarboxylic acid polymer resulting from copolymerization using a polyamidepolyamine monomer which comprises a step of mixing the polycarboxylic acid polymer or polymers with the polyamidepolyamine and/or the polycarboxylic acid polymer resulting from copolymerization using a polyamidepolyamine monomer.

DISCLOSURE OF THE INVENTION

In the following, the present invention is described in detail.

The cement admixture of the present invention is of at least one kind selected from among the following (I-1) to (I-6), (II-1) to (II-3) and (III-1) to (III-3).

Embodiment (I): (I-1) A form comprising a polycarboxylic acid polymer and nitrogen atom-containing compound having non-amide bond; (I-2) a form comprising two or more species of polycarboxylic acid polymers and nitrogen atom-containing compound having non-amide bond (combination of these); (I-3) a form in which the above-mentioned polycarboxylic acid polymer includes a polycarboxylic acid polymer resulting from copolymerization using a nitrogen atom-containing monomer (combination of a nitrogen atom-containing compound having non-amide bond with two or more species of polycarboxylic acid polymers including a polycarboxylic acid polymer resulting from copolymerization using a nitrogen atom-containing monomer); (I-4) a form in which the above-mentioned polycarboxylic acid polymer further includes a polycarboxylic acid polymer other than the polycarboxylic acid polymer resulting from copolymerization using a nitrogen atom-containing monomer (combination of a polycarboxylic acid polymer comprising a polycarboxylic acid polymer resulting from copolymerization using a nitrogen atom-containing monomer, and a polycarboxylic acid polymer other than the polycarboxylic acid polymer just mentioned above, with a nitrogen atom-containing compound having non-amide bond); (I-5) a form in which the above-mentioned polycarboxylic acid polymer other than the polycarboxylic acid polymer resulting from copolymerization using a nitrogen atom-containing monomer includes two or more species (combination of a polycarboxylic acid polymer resulting from copolymerization using a nitrogen atom-containing monomer and two or more polycarboxylic acid polymers other than the polycarboxylic acid polymer just mentioned above, namely three or more species of polycarboxylic acid polymers, with a nitrogen atom-containing compound having non-amide bond); and (I-6) a form comprising two or more species of polycarboxylic acid polymers other than a polycarboxylic acid polymer resulting from copolymerization using a nitrogen atom-containing monomer having non-amide bond, with the polycarboxylic acid polymer resulting from copolymerization using a nitrogen atom-containing monomer having non-amide bond (combination of these).

Embodiment (II): (II-1) A form comprising a combination of a polycarboxylic acid polymer and a polyhydric alcohol-alkylene oxide adduct; (II-2) a form comprising a combination of a polycarboxylic acid polymer resulting from copolymerization using a polyhydric alcohol-alkylene oxide adduct monomer with a polyhydric alcohol-alkylene oxide adduct; and (II-3) a form comprising a combination of a polycarboxylic acid polymer resulting from copolymerization using a polyhydric alcohol-alkylene oxide adduct monomer with another polycarboxylic acid polymer.

Embodiment (III): (III-1) A form comprising a combination of a polycarboxylic acid polymer and a polyamidepolyamine;

(III-2) a form comprising a combination of a polycarboxylic acid polymer resulting from copolymerization using a polyamidepolyamine monomer with a polyamidepolyamine; and (III-3) a form comprising a combination of a polycarboxylic acid polymer resulting from copolymerization using a polyamidepolyamine monomer with another polycarboxylic acid polymer.

The term "nitrogen atom-containing monomer having non-amide bond" as used herein means that the nitrogen atom-containing compound having non-amide bond which has a polymerizable unsaturated double bond, the term "polyhydric alcohol-alkylene oxide adduct monomer" means that the polyhydric alcohol-alkylene oxide adduct which has a polymerizable unsaturated double bond, and the term "polyamidepolyamine monomer" means that the polyamidepolyamine which has a polymerizable unsaturated double bond.

In the above-mentioned forms (I-1) to (I-5), among those forms, the nitrogen atom-containing compound having non-amide bond may comprise one single species or two or more species. In the above forms (I-3) to (I-5), the polycarboxylic acid polymer resulting from copolymerization using a nitrogen atom-containing monomer may comprise one single species or two or more species and, in the above form (I-6), the polycarboxylic acid polymer resulting from copolymerization using a nitrogen atom-containing monomer having non-amide bond may comprise one single species or two or more species. In the above-mentioned forms (II-1) to (II-3), the polycarboxylic acid polymer, the polycarboxylic acid polymer resulting from copolymerization using a polyhydric alcohol-alkylene oxide adduct monomer and the polyhydric alcohol-alkylene oxide adduct each may comprise one single species or two or more species, however, it is preferred, that each form contains two or more species of polycarboxylic acid polymers.

In the above forms (III-1) to (III-3), the polycarboxylic acid polymer, the polycarboxylic acid polymer resulting from copolymerization using a polyamidepolyamine monomer and the polyamidepolyamine each may comprise one single species or two or more species, however, it is preferred, that each form contains two or more polycarboxylic acid polymers.

The term "two or more species of polycarboxylic acid polymers" means that two or more different species of polycarboxylic acid polymers. It is used herein to indicate two or more species of polycarboxylic acid polymer differing in average molecular weight or, when polyalkylene oxide adduct-derived ones are involved, as described later herein, two or more species of polycarboxylic acid polymers differing in the molar number of addition of the corresponding alkylene oxide or in polymer characteristics resulting from a difference(s) in composition of polyoxyalkylene oxide units and carboxylic acid units, for instance. In the practice of the present invention, however, two or more species of polycarboxylic acid polymers differing in the molar number of addition of the alkylene oxide are preferably used. By the term "difference in composition of polyoxyalkylene oxide units and carboxylic acid units", it is meant that there is a difference of at least 2% by mass, as expressed in terms of sodium carboxylate content on the polymer solid content, between two carboxylic acid units. In a preferred embodiment, the two or more species of polycarboxylic acids each have a weigh average molecular weight within the range of 5,006 to 60,000, more preferably within the range of 6,000 to 30,000, with a difference(s) in weight average molecular weight being not more than 10,000, more preferably not more than 5,000, still more preferably not more than 2,000. The difference in the average molar number of addition between two polyalkylene glycol units is preferably not less than 3, more preferably not less than 5. The difference in mass between two carboxylic acid units is preferably not more than 15% by mass, more preferably not more than 10% by mass, still more preferably not more than 5% by mass, as expressed in terms of sodium carboxylate on the polymer solid content.

In the description that follows, these constituent elements to be used in accordance with the present invention are symbolized as follows: polycarboxylic acid polymer (A); nitrogen atom-containing compound having non-amide bond (B); polycarboxylic acid polymer resulting from copolymerization using a nitrogen atom-containing monomer (C); polycarboxylic acid polymer resulting from copolymerization using a nitrogen atom-containing monomer having non-amide bond (D); polycarboxylic acid polymer resulting from copolymerization using a polyhydric alcohol-alkylene oxide adduct monomer (E); polyhydric alcohol-alkylene oxide adduct (F); polycarboxylic acid polymer resulting from copolymerization using a polyamidepolyamine monomer (G); and polyamidepolyamine (H).

In the form (I-1) mentioned above, the mass ratio (A/B) between the polycarboxylic acid polymer (A) and the nitrogen atom-containing compound having non-amide bond (B) is as follows: 200>(A/B)>1. When it is 1 or lower, the resulting cement admixture will be poor in water-reducing performance and, when it is above 200, the viscosity reducing effect will decrease. The mass ratio (A/B) between the above-mentioned polycarboxylic acid polymer (A) and the nitrogen atom-containing compound having non-amide bond (B) is more preferably 100>(A/B)>2, still more preferably 50>(A/B)>4. The "mass ratio (A/B) between the polycarboxylic acid polymer (A) and the nitrogen atom-containing compound having non-amide bond (B)" so referred to above means the quotient obtained by dividing the mass of the polycarboxylic acid polymer (A) by the mass of the nitrogen atom-containing compound having non-amide bond (B).

In the form (I-2) mentioned above, the cement admixture preferably contains not less than 1% by mass of the nitrogen atom-containing compound having non-amide bond (B) relative to 100% by mass of the solid content in the cement admixture. The amount of the nitrogen atom-containing compound having non-amide bond (B) to be used is more preferably not less than 3% by mass but not more than 80% by mass. Still more preferably, it is not less than 5% by mass but not more than 60% by mass. Especially preferably, it is not less than 10% by mass but not more than 50% by mass and, most preferably, it is not less than 15% by mass but not more than 40% by mass. In the forms (I-3) to (I-5) or in the form (I-6) mentioned above, the cement admixture preferably contains the polycarboxylic acid polymer resulting from copolymerization using a nitrogen atom-containing monomer (C) or the polycarboxylic acid polymer resulting from copolymerization using a nitrogen atom-containing monomer having non-amide bond (D) in an amount of not less than 1% by mass relative to 100% by mass of the solid content in the cement admixture. The amount of the polycarboxylic acid polymer resulting from copolymerization using a nitrogen atom-containing monomer (C) or the polycarboxylic acid polymer resulting from copolymerization using a nitrogen atom-containing monomer having non-amide bond (D) to be used is more preferably not less than 5% by mass but not more than 80% by mass, still more preferably not less than 10% by mass but not more than 70% by mass, especially preferably not less than 15% by mass but not more than 60% by mass, most preferably not less than 20% by mass.

In the form (I-2) mentioned above, the cement admixture contains the polycarboxylic acid polymer (A) preferably in an amount of not less than 5% by mass, more preferably not less than 10% by mass, still more preferably not less than 15% by mass, relative to 100% by mass of the solid content in the cement admixture. In the forms (I-3) to (I-5) or in the form (I-6), the cement admixture preferably contains not less than 5% by mass, relative to 100% by mass of the solid content in the cement admixture, of the nitrogen atom-containing compound having non-amide bond (B) or a polycarboxylic acid polymer other than the polycarboxylic acid polymer resulting from copolymerization using a nitrogen atom-containing monomer having non-amide bond (D).

In the cement admixtures in the above-mentioned forms (I-1) to (I-6), the amounts of use of the polycarboxylic acid polymer (A), the polycarboxylic acid polymer resulting from copolymerization using a nitrogen atom-containing monomer (C) and another polycarboxylic acid polymers, the polycarboxylic acid polymer resulting from copolymerization using a nitrogen atom-containing monomer having non-amide bond (D) and another polycarboxylic acid polymers, and the nitrogen atom-containing compound having non-amide bond (B) are preferably adjusted within the respective amounts mentioned above, with the total solid content amounting to 100% by mass.

The above-mentioned form (II-1) includes, for example, the combination of a polycarboxylic acid polymer (A) and a polyhydric alcohol-alkylene oxide adduct (F) and the combination of two or more species of polycarboxylic acid polymers (A) and a polyhydric alcohol-alkylene oxide adducts (F), the above-mentioned form (II-2) includes, for example, the combination of polycarboxylic acid polymer resulting from copolymerization using a polyhydric alcohol-alkylene oxide adduct monomer (E) and a polyhydric alcohol-alkylene oxide adduct (F), the combination of a polycarboxylic acid polymer (A), a polycarboxylic acid polymer resulting from copolymerization using a polyhydric alcohol-alkylene oxide adduct monomer (E) and a polyhydric alcohol-alkylene oxide adduct (F), and the combination of two or more species of polycarboxylic acid polymers (A), a polycarboxylic acid polymer resulting from copolymerization using a polyhydric alcohol-alkylene oxide adduct monomer (E) and a polyhydric alcohol-alkylene oxide adduct (F), and the above-mentioned form (II-3) includes, for example, the combination of a polycarboxylic acid polymer (A) and a polycarboxylic acid polymer resulting from copolymerization using a polyhydric alcohol-alkylene oxide adduct monomer (E) and the combination of two or more species of polycarboxylic acid polymers (A) and a polycarboxylic acid polymer resulting from copolymerization using a polyhydric alcohol-alkylene oxide adduct monomer (E), and the like.

These combinations all constitute preferred embodiments of the present invention, and the forms in which two or more species of polycarboxylic acid polymers (A) are used are more preferred embodiments of the present invention.

Further, in the form (II-1) mentioned above, the cement admixture preferably contains a polyhydric alcohol-alkylene oxide adduct (F) in an amount of not less than 0.1% by mass relative to 100% by mass of the solid content in the cement admixture. The amount of use of the above-mentioned polyhydric alcohol-alkylene oxide adduct (F) is more preferably not less than 1% by mass but not more than 80% by mass, still more preferably not less than 2% by mass but nor more than 60% by mass, especially preferably not less than 4% by mass but not more than 50% by mass, most preferably not less than 5% by mass but not more than 40% by mass. In the forms (II-2) and (II-3) mentioned above, the cement admixture preferably contains not less than 0.1% by mass, relative to 100% by mass of the solid content in the cement admixture, of a polycarboxylic acid polymer resulting from copolymerization using a polyhydric alcohol-alkylene oxide adduct monomer (E). The amount of use of the polycarboxylic acid polymer resulting from copolymerization using a polyhydric alcohol-alkylene oxide adduct monomer (E) is more preferably not less than 1% by mass but not more than 60% by mass, still more preferably not less than 2% by mass but not more than 50% by mass, especially preferably not less than 3% by mass but not more than 40% by mass, most preferably not less than 4% by mass but not more than 35% by mass.

Furthermore, in the form (II-1) mentioned above, the cement admixture preferably contains a polycarboxylic acid polymer resulting from copolymerization using a polyhydric alcohol-alkylene oxide adduct monomer (E) in an amount of not less than 5% by mass relative to 100% by mass of the solid content in the cement admixture and, in the forms (II-2) and (II-3) mentioned above, the cement admixture preferably contains a polyhydric alcohol-alkylene oxide adduct (F) in an amount of not less than 5% by mass relative to 100% by mass of the solid content in the cement admixture.

In the cement admixtures in the above forms (II-1) to (II-3), the amounts of use of the polycarboxylic acid polymer (A), the polycarboxylic acid polymer resulting from copolymerization using a polyhydric alcohol-alkylene oxide adduct monomer (E), and the polyhydric alcohol-alkylene oxide adduct (F) are preferably adjusted within the respective amounts mentioned above, with the total solid content amounting to 100% by mass.

The above-mentioned form (III-1) includes, for example, the combination of a polycarboxylic acid polymer (A) and a polyamidepolyamine (H), and the combination of two or more species of polycarboxylic acid polymers (A) and a polyamidepolyamine (H). The above-mentioned form (III-2) includes, for example, the combination of a polycarboxylic acid polymer resulting from copolymerization using a polyamidepolyamine monomer (G) and a polyamidepolyamine (H), the combination of a polycarboxylic acid polymer (A), a polycarboxylic acid polymer resulting from copolymerization using a polyamidepolyamine monomer (G) and a polyamidepolyamine (H), and the combination of two or more species of polycarboxylic acid polymers (A), a polycarboxylic acid polymer resulting from copolymerization using a polyamidepolyamine monomer (G) and a polyamidepolyamine (H). The above-mentioned form (III-3) includes, for example, the combination of a polycarboxylic acid polymer (A) and a polycarboxylic acid polymer resulting from copolymerization using a polyamidepolyamine monomer (G), the combination of two or more species of polycarboxylic acid polymers (A) and a polycarboxylic acid polymer resulting from copolymerization using a polyamidepolyamine monomer (G), and so forth.

These combinations all constitute preferred embodiments of the present invention, and the forms in which two or more species of polycarboxylic acid polymers (A) are used are more preferred embodiments of the invention.

In the above-mentioned form (III-1), the cement admixture contains not less than 16% by mass, relative to 100% by mass of the solid content in the cement admixture, of a polyamidepolyamine (H). The amount of use of the polyamidepolyamine (H) is preferably not less than 18% by mass, more preferably not less than 20% by mass but not more than 50% by mass, still more preferably not less than 22% by mass but not more than 45% by mass, most preferably not less than 24% by mass but not more than 40% by mass, especially preferably not less than 26% by mass but not more than 35% by mass. In the forms (III-2) and (III-3) mentioned above, the cement admixture contains not less than 13% by mass, relative to 100% by mass of the solid content in the cement admixture, of a polycarboxylic acid polymer resulting from copolymerization using a polyamidepolyamine monomer (G). The amount of use of the above-mentioned polycarboxylic acid polymer resulting from copolymerization using a polyamidepolyamine monomer (G) is preferably not less than 15% by mass but not more than 50% by mass, more preferably not less than 17% by mass but not more than 45% by mass, still more preferably not less than 19% by mass but not more than 40% by mass, most preferably not less than 21% by mass but not more than 35% by mass.

In the above form (III-1), the cement admixture preferably contains a polycarboxylic acid polymer resulting from copolymerization using a polyamidepolyamine monomer (G) in an amount of not less than 13% by mass relative to 100% by mass of the solid content in the cement admixture and, in the above forms (III-2) and (III-3), the cement admixture preferably contains a polyamidepolyamine (H) in an amount of not less than 16% by mass, more preferably not less than 18% by mass, relative to 100% by mass of the solid content in the cement admixture.

In the cement admixtures in the above forms (III-1) to (III-3), the amounts of use of the polycarboxylic acid polymer (A), the polycarboxylic acid polymer resulting from copolymerization using a polyamidepolyamine monomer (G), and the polyamidepolyamine (H) are preferably adjusted within the respective amounts mentioned above, with the total solid content amounting to 100% by mass.

The following method of determining the solid content in each cement admixture is judiciously used in the practice of the present invention.

(Method of Solid Content Determination)
1. An aluminum dish is accurately weighed.
2. The sample for solid content determination is accurately weighed on the aluminum dish accurately weighed in step 1.
3. The sample on the dish as accurately weighed in step 2 is placed and maintained in a drier adjusted to a temperature of 130° C. for 1 hour.
4. After the lapse of 1 hour, the sample on the dish is taken out of the drier and allowed to cool in a desiccator at room temperature for 15 minutes.
5. After 15 minutes, the aluminum dish and sample are taken out of the desiccator and accurately weighed.
6. The mass of the aluminum dish as obtained in step 1 is subtracted from the mass obtained in step 5, and the mass of the solid content thus obtained is divided by the mass obtained in step 2, whereby the solid content is determined.

In determining, in the present invention, the proportion, on the solid content relative to the solid content in the cement admixture, of the nitrogen atom-containing compound having non-amide bond (B), polyhydric alcohol-alkylene oxide adduct (F) or polyamidepolyamine (H) (hereinafter collectively referred to as "compound (X)") and in determining the proportion, on the solid content relative to the solid content in the cement admixture, of the polycarboxylic acid polymer resulting from copolymerization using a nitrogen atom-containing monomer (C), polycarboxylic acid polymer resulting from copolymerization using a nitrogen atom-containing monomer having non-amide bond (D), polycarboxylic acid polymer resulting from copolymerization using a polyhydric alcohol-alkylene oxide adduct monomer (E), or polycarboxylic acid polymer resulting from copolymerization using a polyamidepolyamine monomer (G) (hereinafter collectively referred to as "polymer (Y)"), the following method is judiciously used.

1. The pH of an aqueous solution of the cement admixture as adjusted to a solid content of 20% by mass is adjusted to 2.0 by adding 20% by mass of an aqueous solution of para-toluenesulfonic acid.
2. The mixture adjusted in step 1 is adjusted to a temperature of 85° C. and allowed to stand for 1 hour.
3. After confirmation of separation of the mixture into two layers, the supernatant and sediment are separated from each other.
4. The supernatant is concentrated, followed by para-toluenesulfonic acid assaying by liquid chromatography. The mass of compound (X) is calculated by subtracting the mass of para-toluenesulfonic acid. The proportion of compound (X) on the solid content is calculated by dividing the mass of compound (X) thus obtained by the mass of the cement admixture used in step 1.
5. An equal amount of water is added to the sediment obtained in step 3, and the mixture is adjusted to a temperature of 85° C. and allowed to stand for 1 hour.
6. After confirmation of separation of the mixture into two layers, the supernatant and sediment are separated from each other.
7. The supernatant is concentrated, followed by para-toluenesulfonic acid assaying by liquid chromatography. The mass of polymer (Y) is calculated by subtracting the mass of para-toluenesulfonic acid. The proportion of polymer (Y) on the solid content is calculated by dividing the mass of polymer (Y) thus obtained by the mass of the cement admixture used in step 1.

As for the method of producing the cement admixture of the present invention, the cement admixture in the form (I-1) mentioned above is judiciously produced by a method of producing cement admixtures comprising a polycarboxylic acid polymer and nitrogen atom-containing compound having non-amide bond which method comprises the step of blending the polycarboxylic acid polymer with the nitrogen atom-containing compound having non-amide bond.

Further regarding the method of producing the cement admixture of the present invention, the cement admixtures in the forms (I-2) to (I-5) mentioned above are judiciously produced by a method of producing cement admixtures comprising two or more species of polycarboxylic acid polymers and nitrogen atom-containing compound having non-amide bond which method comprises the step of mixing up the two or more species of polycarboxylic acid polymer with the nitrogen atom-containing compound having non-amide bond.

In such method of producing cement admixtures, the cement admixtures are produced by mixing up two or more species of polycarboxylic acid polymers (A), including a polycarboxylic acid polymer resulting from copolymerization using a nitrogen atom-containing monomer (C) and/or another or other polycarboxylic acid polymers, and nitrogen atom-containing compound having non-amide bond (B), each separately prepared.

In the case of cement admixtures in the form (I-6) mentioned above, the cement admixtures of the present invention are judiciously produced by a method of producing cement admixtures comprising two or more species of polycarboxylic acid polymers other than polycarboxylic acid polymers resulting from copolymerization using nitrogen atom-containing monomer having non-amide bond with a polycarboxylic acid polymer resulting from copolymerization using a nitrogen atom-containing monomer having non-amide bond which method comprises the step of mixing up the two or more species of polycarboxylic acid polymers other than polycarboxylic acid polymers resulting from copolymerization using nitrogen atom-containing monomer having non-amide bond with the polycarboxylic acid polymer resulting from copolymerization using a nitrogen atom-containing monomer having non-amide bond.

In such method of producing cement admixtures, the cement admixtures are produced by mixing up two or more species of polycarboxylic acid polymers other than polycarboxylic acid polymers resulting from copolymerization using nitrogen atom-containing monomer having non-amide bond (D) and one or two or more species of polycarboxylic acid polymers resulting from copolymerization using nitrogen atom-containing monomer having non-amide bond (D), each separately prepared.

In the above forms, the polycarboxylic acid polymer resulting from copolymerization using a nitrogen atom-containing monomer (C) is preferably a polycarboxylic acid polymer resulting from copolymerization using a nitrogen atom-containing monomer having non-amide bond (D).

In accordance with the method of producing cement admixtures according to the present invention, they are produced by mixing up one or two or more species of polycarboxylic acid polymers (A) and a polyhydric alcohol-alkylene oxide adduct (F), each separately prepared.

In accordance with the method of producing cement admixtures according to the present invention, they are also produced by mixing up one or two or more species of polycarboxylic acid polymers (A) and a polycarboxylic acid polymer resulting from copolymerization using a polyhydric alcohol-alkylene oxide adduct monomer (E), each separately prepared.

In accordance with the method of producing cement admixtures according to the present invention, they are also produced by mixing up one or two or more species of polycarboxylic acid polymers (A) and a polyamidepolyamine (H) and/or a polycarboxylic acid polymer resulting from copolymerization using a polyamidepolyamine monomer (G), each separately prepared.

In the following, the polycarboxylic acid polymer (A), the nitrogen atom-containing compound having non-amide bond (B), the polycarboxylic acid polymer resulting from copolymerization using a nitrogen atom-containing monomer having non-amide bond (D), the polycarboxylic acid polymer resulting from copolymerization using a polyhydric alcohol-alkylene oxide monomer (E), the polyhydric alcohol-alkylene oxide adduct (F), the polycarboxylic acid polymer resulting from copolymerization using a polyamidepolyamine monomer (G), and the polyamidepolyamine (H), which are to be used in accordance with the present invention, are described.

Suited for use as the above-mentioned polycarboxylic acid polymer (A) are polymers resulting from copolymerization of a monomer component comprising, as essential constituents, a polyalkylene glycol unsaturated monomer (a) and an unsaturated carboxylic acid monomer (b), more preferably from copolymerization of a monomer component comprising 1 to 99% by mass of a polyalkylene glycol unsaturated monomer (a) and 99 to 1% by mass of an unsaturated carboxylic acid monomer (b), still more preferably from copolymerization of a monomer component comprising 40 to 97% by mass of a polyalkylene glycol unsaturated monomer (a) and 60 to 3% by mass of an unsaturated carboxylic acid monomer (b).

Hereinafter, the polyalkylene glycol unsaturated monomer (a) and unsaturated carboxylic acid monomer (b) are referred to also as "monomer (a)" and "monomer (b)", respectively.

The above-mentioned monomers to form the polycarboxylic acid polymer (A) each may comprise one single species or a combination of two or more species. When the mass proportions of these monomers are outside the above-specified ranges, the repeating units formed by the respective monomers will no longer perform their functions effectively, hence the effects of the present invention may possibly be not fully produced. The mass proportions of the monomers (a) and (b) in the monomer component to form the above-mentioned carboxylic acid polymer (A) are percentages by mass with the total mass of the monomers (a) and (b) being taken as 100% by mass.

In the practice of the present invention, another or other monomers may be used in addition to the above-mentioned monomers, as described later herein. In cases where such another or other monomers are used, it is preferred that the sum of the monomers (a) and (b) account for the majority in the monomer component.

The above-mentioned polyalkylene glycol unsaturated monomer (a) may be any of those having a polymerizable unsaturated copolymer and a polyalkylene glycol chain. A polyalkylene glycol ester monomer or an unsaturated alcohol-polyalkylene glycol adduct is thus preferred. The polyalkylene glycol ester monomer may be any of those monomers which have a structure in which an unsaturated group is bonded to a polyalkylene glycol chain via an ester bond. Suited for use are unsaturated carboxylic acid polyalkylene glycol ester compounds, in particular (alkoxy)polyalkylene glycol mono(meth)acrylic esters.

The above-mentioned unsaturated alcohol-polyalkylene glycol adduct may be a compound having a structure such that a polyalkylene glycol chain is added to an alcohol having an unsaturated group. Suitable are vinyl alcohol-alkylene oxide adducts, (meth)allyl alcohol-alkylene oxide adducts, 3-buten-1-ol-alkylene oxide adducts, isoprene alcohol (3-methyl-3-buten-1-ol-alkylene oxide adducts, 3-methyl-2- buten-l-ol-alkylene oxide adducts, 2-methyl-3-buten-2-ol-alkylene oxide adducts, 2-methyl-2-buten-1-ol-alkylene oxide adducts, and 2-methyl-3-buten-1-ol-alkylene oxide adducts, and the like. Also preferred as such unsaturated alcohol-polyalkylene glycol adduct are compounds represented by the following general formula (2):

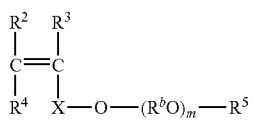

(2)

In the above general formula (2), $R^2$, $R^3$ and $R^4$ are the same or different and each represents a hydrogen atom or a methyl group. $R^5$ represents a hydrogen atom or a hydrocarbon group containing 1 to 20 carbon atoms. $R^b$ may be the same or different and each represents an alkylene group containing 2 to 18 carbon atoms, and m represents the average molar number of addition of the oxyalkylene group represented by $R^bO$ and is a number of 1 to 300. X represents an alkylene group containing 1 to 5 carbon atoms or represents that the carbon atom and oxygen atom bounded thereto are directly bound to each other in case of the group represented by $R^2R^4C=CR^3$— is a vinyl group.

In cases where two or more oxyalkylene group species represented by —($R^bO$)— in the above general formula (2) occur in one and the same unsaturated alcohol-polyalkylene glycol adduct, the oxyalkylene groups represented by —($R^bO$)— may be in any addition mode, namely random addition, block addition, alternate addition or the like.

The oxyalkylene group(s) represented —($R^bO$)— as mentioned above is an alkylene oxide adduct which consists of alkylene oxide groups containing 2 to 18 carbon atoms. Such alkylene oxide adduct has a structure formed by one or two or more of alkylene oxides such as ethylene oxide, propylene oxide, butylene oxide, isobutylene oxide, 1-butene oxide and 2-butene oxide. Among such alkylene oxide adducts, ethylene oxide, propylene oxide and butylene oxide adducts are preferred. Still more preferably, it is mainly formed of ethylene oxides.

The average molar number m of addition of oxyalkylene groups represented by the above $R^bO$ is a number of 1 to 300. If m exceeds 300, the polymerizability of the monomer will decrease. A preferred range of m is not less than 2 and, in —($R^bO$)$_m$—, the average molar number of addition of the oxyalkylene group(s) is preferably not less than 2. If m is less than 2 or the average molar number of addition of the oxyalkylene group(s) is less than 2, sufficient levels of hydrophilicity and steric hindrance to disperse cement particles or the like may not be obtained, hence it may be impossible to obtain excellent fluidity. To obtain excellent fluidity, a preferred range of m is not less than 3 but not more than 280. More preferably, m is not less than 5, still more preferably not less than 10, especially preferably not less than 20. On the other hand, m is more preferably not more than 250, especially preferably not more than 150. As for the average molar number of addition of the oxyalkylene group(s), it is preferably not less than 3 but not more than 280. More preferably, it is not less than 10, still more preferably not less than 20. On the other hand, it is more preferably not more than 250, still more preferably not more than 200, especially preferably not more than 150. The average molar number of addition means the average value for the molar number of the organic group(s) in question forming each mole of monomer by addition. For preparing concrete compositions low in viscosity, as for the range of m, it is preferably not less than 3 but not more than 100, more preferably not less than 4 but not more than 50, still more preferably not less than 4 but not more than 30, most preferably not less than 5 but not more than 25. It is possible to use, as said monomer, a combination of two or more monomer species differing in the average molar number m of addition of the oxyalkylene group(s). As a suitable combination, there may be mentioned, for example, a combination of two monomer species (a) differing the average molar number m of addition by not more than 10 (preferably a difference in m by not more than 5), a combination of two monomer species (a) differing in the average molar number m of addition by not less than 10 (preferably a difference in m by not less than 20), or a combination of not less than three monomer species (a) differing in m by not less than 10 (preferably a difference in m by not less than 20) from one another. Furthermore, as for the range of m for combined use, it is possible to combine a monomer (a) having an average molar number m of addition in the range of 40 to 300 with a monomer (a) having the range of 1 to 40 (the difference in m being not less than 10, preferably not less than 20), or combine a monomer (a) having an average molar number m of addition in the range of 20 to 300 with a monomer (a) having the range of 1 to 20 (the difference in m being not less than 10, preferably not less than 20).

As for the above $R^5$, if the number of carbon atoms exceeds 20, the hydrophobicity of the polycarboxylic acid polymer becomes excessively strong, so that no good dispersing ability can be obtained. From the dispersing capacity viewpoint, a preferred embodiment of $R^5$ is a hydrocarbon group containing 1 to 20 carbon atoms or a hydrogen, more preferably a hydrocarbon group containing not more than 10 carbon atoms, still more preferably not more than 3 carbon atoms, especially preferably not more than 2 carbon atoms. Among the hydrocarbon groups, saturated alkyl groups and unsaturated alkyl groups are preferred. These alkyl groups may be straight chained or branched. For attaining excellent segregation preventing capacity and rendering the air amount entrained into cement compositions adequate, hydrocarbon groups containing not less than 5 carbon atoms are preferred, and hydrocarbon groups containing not more than 20 carbon atoms are preferred. More preferred are hydrocarbon groups containing 5 to 10 carbon atoms. Among the hydrocarbon groups, saturated alkyl groups and unsaturated alkyl groups are preferred. These alkyl groups may be straight chained or branched.

The above-mentioned unsaturated alcohol-polyalkylene glycol adduct may be the one as mentioned above. Suitable are polyethylene glycol monovinyl ether, polyethylene glycol monoallyl ether, polyethylene glycol mono(2-methyl-2-propenyl) ether, polyethylene glycol mono(2-butenyl) ether, polyethylene glycol mono(3-methyl-3-butenyl)ether, polyethylene glycol mono(3-methyl-2-butenyl)ether, polyethylene glycol mono(2-methyl-3-butenyl)ether, polyethylene glycol mono(2-methyl-2-butenyl)ether, polyethylene glycol mono(1,1-dimethyl-2-propenyl)ether, polyethylene-polypropylene glycol mono(3-methyl-3-butenyl) ether, methoxypolyethylene glycol mono(3-methyl-3-butenyl) ether, ethoxypolyethylene glycol mono(3-methyl-3-butenyl) ether, 1-propoxypolyethylene glycol mono(3-methyl-3-butenyl)ether, cyclohexyloxypolyethylene glycol mono(3-methyl-3-butenyl)ether, 1-octyloxypolyethylene glycol mono (3-methyl-3-butenyl)ether, nonylalkoxypolyethylene glycol mono(3-methyl-3-butenyl)ether, laurylalkoxypolyethylene glycol mono(3-methyl-3-butenyl) ether, stearylalkoxypolyethylene glycol mono(3-methyl-3-butenyl)ether, phenoxypolyethylene glycol mono(3-methyl-3-butenyl)ether, naphthoxypolyethylene glycol mono(3-methyl -3-butenyl)ether, methoxypolyethylene glycol monoallyl ether, ethoxypolyethylene glycol monoallyl ether, phenoxypolyethylene glycol monoallyl ether, methoxypolyethylene glycol mono(2-methyl-2-propenyl)ether, ethoxypolyethylene glycol mono(2-methyl-2-propenyl)ether, phenoxypolyethylene glycol mono (2-methyl-2-propenyl)ether and the like.

Preferred as the above-mentioned (alkoxy)polyalkylene glycol mono(meth)acrylate are compounds represented by the following general formula (3):

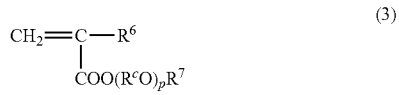

(3)

In the above general formula (3), $R^6$ represents a hydrogen atom or a methyl group, $R^c$ may be the same or different and each represents an alkylene group containing 2 to 18 carbon atoms, $R^7$ represents a hydrogen atom or a hydrocarbon group containing 1 to 30 carbon atoms, and p represents the average molar number of addition of the oxyalkylene group represented by $R^cO$ and is a number of 2 to 300.

As for the oxyalkylene group represented by 12 ($R^cO$)— in the above general formula (3) and the average molar number p of addition of the oxyalkylene group represented by $R^cO$, the same as mentioned above referring to the general formula (2) may be mentioned. From the viewpoint of esterification productivity improvement with (meth)acrylic acid, it is preferred that the ethylene oxide moiety be added to the site of the ester bond with (meth)acrylic acid.

The average molar number p of addition of oxyalkylene groups represented by the above $R^cO$ is a number of 2 to 300. If p exceeds 300, the polymerizability of the monomer will decrease. A preferred range of p is not less than 2 and, in —($R^cO$)$_p$—, the average molar number of addition of the oxyalkylene group(s) is preferably not less than 2. If p is less than 2 or the average molar number of addition of the oxyalkylene group(s) is less than 2, sufficient levels of hydrophilicity and steric hindrance to disperse cement particles or the like may not be obtained, hence it may be impossible to obtain excellent fluidity. To obtain excellent fluidity, a preferred range of p is not less than 3 but not more than 280. More preferably, p is not less than 5, still more preferably not less than 10, especially preferably not less than 20. On the other hand, p is more preferably not more than 250, still more preferably not more than 200, especially preferably not more than 150. As for the average molar number of addition of the oxyalkylene group(s), it is preferably not less than 5 but not more than 250. More preferably, it is not less than 10, still more preferably not less than 20. On the other hand, it is more preferably not more than 200, still more preferably not more than 150. For preparing concrete compositions low in viscosity, a preferred range of p is not less than 3 but not more than 100. More preferably, p is not less than 4 but not more than 50, still more preferably not less than 4 but not more than 30, especially preferably not less than 5 but not more than 25. The average molar number of addition means the average value for the molar number of the organic group(s) in question forming each mole of monomer by addition. It is possible to use, as said monomer, a combination of two or more monomer species differing in the average molar number p of addition of the oxyalkylene group(s). As a suitable combination, there may be mentioned, for example, a combination of two monomer (a) differing in p by not more than 10 (preferably a difference in p by not more than 5), a combination of two monomer (a) differing in p by not less than 10 (preferably a difference in p by not less than 20), or a combination of not less than three monomer species (a) differing in the average molar number p of addition by not less than 10 (preferably a difference in p by not less than 20) from one another. Furthermore, as for the range of p for combined use, it is possible to combine a monomer (a) having an average molar number p of addition in the range of 40 to 300 with a monomer (a) having the range of 2 to 40 (the difference in p being not less than 10, preferably not less than 20), or combine a monomer species (a) having an average molar number p of addition in the range of 20 to 300 with a monomer species (a) having the range of 2 to 20 (the difference in p being not less than 10, preferably not less than 20).

As for the above $R^7$, if the number of carbon atoms exceeds 30, the hydrophobicity of the polycarboxylic acid polymer becomes excessively strong, so that no good dispersing capacity can be obtained. From the dispersing capacity viewpoint, a preferred embodiment of $R^7$ is a hydrocarbon group containing 1 to 20 carbon atoms or a hydrogen, more preferably a hydrocarbon group containing not more than 10 carbon atoms, still more preferably not more than 3 carbon atoms, especially preferably not more than 2 carbon atoms. Among the hydrocarbon groups, saturated alkyl groups and unsaturated alkyl groups are preferred. These alkyl groups may be straight chained or branched. For attaining excellent segregation preventing capacity and rendering the air amount entrained into cement compositions adequate, hydrocarbon groups containing not less than 5 carbon atoms are preferred, and hydrocarbon groups containing not more than 20 carbon atoms are preferred. More preferred are hydrocarbon groups containing 5 to 10 carbon atoms. Among the hydrocarbon groups, saturated alkyl groups and unsaturated alkyl groups are preferred. These alkyl groups may be straight chained or branched.

The above-mentioned (alkoxy)polyalkylene glycol mono (meth)acrylate may be the one mentioned above, but suitable are esterification products of (meth)acrylic acid with alkoxypolyalkylene glycols, especially preferably alkoxypolyalkylene glycols which are mainly formed of an ethylene oxide group(s), obtained by addition of 1 to 300 moles of an alkylene oxide group(s) containing 2 to 18 carbon atoms to any of aliphatic alcohols containing 1 to 30 carbon atoms such as methanol, ethanol, 1-propanol, 2-propanol, 1-butanol, 2-butanol, 1-pentanol, 2-pentanol, 3-pentanol, 1-hexanol, 2-hexanol, 3-hexanol, octanol, 2-ethyl-1-hexanol, nonyl alcohol, lauryl alcohol, cetyl alcohol and stearyl alcohol; alicyclic alcohols containing 3 to 30 carbon atoms such as cyclohexanol; and unsaturated alcohols containing 3 to 30 carbon atoms such as (meth)allyl alcohol, 3-buten-1-ol and 3-methyl-3-buten-1-ol.

Suitable as said esterification products are those (alkoxy) polyethylene glycol (poly)(alkylene glycol containing 2 to 4 carbon atoms) (meth)acrylates which are given below:

Methoxypolyethylene glycol mono(meth)acrylate, methoxy{polyethylene glycol-(poly)propylene glycol}mono (meth)acrylate, methoxy{polyethylene glycol-(poly)butylene glycol}mono(meth)acrylate, methoxy{polyethylene glycol-(poly)propylene glycol-(poly)butylene glycol}mono (meth)acrylate, ethoxypolyethylene glycol mono(meth)acrylate, ethoxy{polyethylene glycol-(poly)propylene glycol}mono(meth)acrylate, ethoxy{polyethylene glycol-(poly)butylene glycol}mono(meth)acrylate, ethoxy{polyethylene glycol-(poly)propylene glycol-(poly) butylene glycol}mono(meth)acrylate, propoxypolyethylene glycol mono(meth)acrylate, propoxy{polyethylene glycol- (poly)propylene glycol}mono(meth)acrylate, propoxy{polyethylene glycol-(poly)butylene glycol}mono(meth)acrylate, propoxy{polyethylene glycol-(poly)propylene glycol-(poly)butylene glycol}mono(meth)acrylate, butoxypolyethylene glycol mono(meth)acrylate, butoxy{polyethylene glycol-(poly)propylene glycol}mono(meth)acrylate, butoxy{polyethylene glycol-(poly)butylene glycol}mono(meth)acrylate, butoxy{polyethylene glycol-(poly)propylene glycol-(poly)butylene glycol}mono(meth)acrylate, pentoxypolyethylene glycol mono(meth)acrylate, pentoxy{polyethylene glycol-(poly)propylene glycol}mono(meth)acrylate, pentoxy{polyethylene glycol-(poly)butylene glycol}mono(meth)acrylate, pentoxy{polyethylene glycol-(poly)propylene glycol-(poly)butylene glycol}mono(meth)acrylate, hexoxypolyethylene glycol mono(meth)acrylate, hexoxy{polyethylene glycol-(poly)propylene glycol}mono(meth)acrylate, hexoxy{polyethylene glycol-(poly)butylene glycol}mono(meth)acrylate, hexoxy{polyethylene glycol-(poly)propylene glycol-(poly)butylene glycol}mono(meth)acrylate, heptoxypolyethylene glycol mono(meth)acrylate, heptoxy{polyethylene glycol-(poly)propylene glycol) mono(meth)acrylate, heptoxy{polyethylene glycol-(poly)butylene glycol}mono(meth)acrylate, heptoxy{polyethylene glycol-(poly)propylene glycol-(poly)butylene glycol}mono(meth)acrylate, octoxypolyethylene glycol mono(meth)acrylate, octoxy{polyethylene glycol-(poly)propylene glycol}mono(meth)acrylate, octoxy(polyethylene glycol-(poly)butylene glycol}mono(meth)acrylate, octoxy{polyethylene glycol-(poly)propylene glycol-(poly)butylene glycol}mono(meth)acrylate, nonanoxypolyethylene glycol mono(meth)acrylate, nonanoxy{polyethylene glycol-(poly)propylene glycol}mono(meth)acrylate, nonanoxy{polyethylene glycol-(poly)butylene glycol}mono(meth)acrylate, nonanoxy{polyethylene glycol-(poly)propylene glycol-(poly)butylene glycol}mono(meth)acrylate, decanoxypolyethylene glycol mono(meth)acrylate, decanoxy{polyethylene glycol-(poly)propylene glycol}mono(meth)acrylate, decanoxy{polyethylene glycol-(poly)butylene glycol}mono(meth)acrylate, decanoxy{polyethylene glycol-(poly)propylene glycol-(poly)butylene glycol}mono(meth)acrylate, undecanoxypolyethylene glycol mono(meth)acrylate, undecanoxy{polyethylene glycol-(poly)propylene glycol}mono(meth)acrylate, undecanoxy(polyethylene glycol-(poly)butylene glycol}mono(meth)acrylate, undecanoxy{polyethylene glycol-(poly)propylene glycol-(poly)butylene glycol}mono(meth)acrylate, dodecanoxypolyethylene glycol mono(meth)acrylate, dodecanoxy{polyethylene glycol-(poly)propylene glycol}mono(meth)acrylate, dodecanoxy{polyethylene glycol-(poly)butylene glycol}mono(meth)acrylate, dodecanoxy{polyethylene glycol-(poly)propylene glycol-(poly)butylene glycol}mono(meth)acrylate, tridecanoxypolyethylene glycol mono(meth)acrylate, tridecanoxy{polyethylene glycol-(poly)propylene glycol}mono(meth)acrylate, tridecanoxy(polyethylene glycol-(poly)butylene glycol}mono(meth)acrylate, tridecanoxy{polyethylene glycol-(poly)propylene glycol-(poly)butylene glycol}mono(meth)acrylate, tetradecanoxypolyethylene glycol mono(meth)acrylate, tetradecanoxy{polyethylene glycol-(poly)propylene glycol}mono(meth)acrylate, tetradecanoxy{polyethylene glycol-(poly)butylene glycol}mono(meth)acrylate, tetradecanoxy{polyethylene glycol-(poly)propylene glycol-(poly)butylene glycol}mono(meth)acrylate, pentadecanoxypolyethylene glycol mono(meth)acrylate, pentadecanoxy{polyethylene glycol-(poly)propylene glycol}mono(meth)acrylate, pentadecanoxy{polyethylene glycol-(poly)butylene glycol}mono(meth)acrylate, pentadecanoxy{polyethylene glycol-(poly)propylene glycol-(poly)butylene glycol}mono(meth)acrylate, hexadecanoxypolyethylene glycol mono(meth)acrylate, hexadecanoxy{polyethylene glycol-(poly)propylene glycol}mono(meth)acrylate, hexadecanoxy{polyethylene glycol-(poly)butylene glycol}mono(meth)acrylate, hexadecanoxy{polyethylene glycol-(poly)propylene glycol-(poly)butylene glycol}mono(meth)acrylate, heptadecanoxypolyethylene glycol mono(meth)acrylate, heptadecanoxy{polyethylene glycol-(poly)propylene glycol}mono(meth)acrylate, heptadecanoxy{polyethylene glycol-(poly)butylene glycol}mono(meth)acrylate, heptadecanoxy{polyethylene glycol-(poly)propylene glycol-(poly)butylene glycol}mono(meth)acrylate, octadecanoxypolyethylene glycol mono(meth)acrylate, octadecanoxy{polyethylene glycol-(poly)propylene glycol}mono(meth)acrylate, octadecanoxy(polyethylene glycol-(poly)butylene glycol}mono(meth)acrylate, octadecanoxy{polyethylene glycol-(poly)propylene glycol-(poly)butylene glycol}mono(meth)acrylate, nonadecanoxypolyethylene glycol mono(meth)acrylate, nonadecanoxy{polyethylene glycol-(poly)propylene glycol}mono(meth)acrylate, nonadecanoxy(polyethylene glycol-(poly)butylene glycol}mono(meth)acrylate, nonadecanoxy{polyethylene glycol-(poly)propylene glycol-(poly)butylene glycol}mono(meth)acrylate, cyclopentoxypolyethylene glycol mono(meth)acrylate, cyclopentoxy{polyethylene glycol-(poly)propylene glycol}mono(meth)acrylate, cyclopentoxy(polyethylene glycol-(poly)butylene glycol}mono(meth)acrylate, cyclopentoxy{polyethylene glycol-(poly) propylene glycol-(poly)butylene glycol}mono(meth)acrylate, cyclohexoxypolyethylene glycol mono(meth)acrylate, cyclohexoxy{polyethylene glycol-(poly)propylene glycol}mono(meth)acrylate, cyclohexoxy{polyethylene glycol-(poly)butylene glycol}mono(meth)acrylate, cyclohexoxy{polyethylene glycol-(poly)propylene glycol-(poly)butylene glycol}mono(meth)acrylate.

As the above-mentioned (alkoxy)polyalkylene glycol mono(meth)acrylate, not only compounds represented by the above general formula (2), but also phenoxypolyethylene glycol mono(meth)acrylate, phenoxy{polyethylene glycol-(poly)propylene glycol}mono(meth)acrylate, phenoxy{polyethylene glycol-(poly)butylene glycol}mono(meth)acrylate, phenoxy{polyethylene glycol-(poly)propylene glycol-(poly)butylene glycol}mono(meth)acrylate, (meth)allyloxypolyethylene glycol mono(meth)acrylate, (meth)allyloxy{polyethylene glycol-(poly)propylene glycol}mono(meth)acrylate, (meth)allyloxy{polyethylene glycol-(poly)butylene glycol}mono(meth)acrylate and (meth)allyloxy{polyethylene glycol-(poly)propylene glycol-(poly) butylene glycol}mono(meth)acrylate are suitable.

Suitable as the above polyalkylene glycol ester monomer in the above polyalkylene glycol unsaturated monomers (a) are also a compound represented by the following general formula (4):

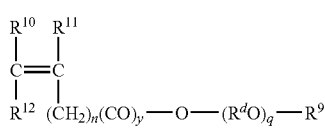

(4)

In the above general formula (4), $R^9$ represents a hydrocarbon group containing 1 to 20 carbon atoms. $R^{10}$ and $R^{11}$ may be the same or different and each represents a hydrogen atom or a methyl group, $R^{12}$ represents a hydrogen atom or a group represented by —COO($R^dO$)$R^9$. $R^d$ may be the same or different and represents an alkylene group containing 2 to 18 carbon atoms. n is a number of 0 to 2. y is a number of 0 or 1. q represents the average molar number of addition of the oxyalkylene group represented by $R^dO$ and is a number of 1 to 300.

As for the oxyalkylene group represented by —($R^dO$)— in the above general formula (4) and the average molar number q of addition of the oxyalkylene group represented by $R^dO$, the same as mentioned above referring to the general formula (2) may be mentioned.

The average molar number q of addition of oxyalkylene groups represented by the above $R^dO$ is a number of 1 to 300. If q exceeds 300, the polymerizability of the monomer will decrease. To obtain a cement admixture having high water-reducing ability, a preferred range of q is not less than 40 but not more than 300. More preferably, q is not less than 50 but not more than 200, especially preferably not less than 80 but not more than 130.

The above $R^9$ is preferably the same as the above $R^5$ in the above general formula (2).

Suitable as the above polyalkylene glycol ester monomer are not only the (alkoxy)polyalkylene glycol mono(meth)acrylate but also (alkoxy)polyalkylene glycol monomaleate, (alkoxy)polyalkylene glycol dimaleate and the like. As such monomers, the following ones are suitable.

Half esters and diesters derived from alkylpolyalkylene glycols obtained by addition of 1 to 300 moles of an oxyalkylene containing 2 to 4 carbon atoms to an alcohol containing 1 to 22 carbon atoms or an amine containing 1 to 22 carbon atoms and the above-mentioned unsaturated dicarboxylic acid monomers; half esters and diesters derived from the above-mentioned unsaturated dicarboxylic acid monomers and polyalkylene glycols having an average molar number of addition of a glycol(s) containing 2 to 4 carbon atoms of 2 to 300; (poly)alkylene glycol di(meth)acrylates such as triethylene glycol di(meth)acrylate, (poly)ethylene glycol di(meth)acrylate, polypropylene glycol di(meth)acrylate, and (poly)ethylene glycol-(poly)propylene glycol di(meth)acrylate; (poly)alkylene glycol dimaleates such as triethylene glycol dimaleate and polyethylene glycol dimaleate.

In the present invention, the unsaturated carboxylic acid monomer (b) may be any of those monomers which have a polymerizable unsaturated group and a group capable of forming a carbanion. Suited are, however, an unsaturated monocarboxylic acid monomer and an unsaturated dicarboxylic acid monomer and the like.

The above unsaturated monocarboxylic acid monomer may be a monomer having one unsaturated group and one group capable of forming a carbanion within the molecule. In a preferred embodiment, it is a compound represented by the following general formula (5):

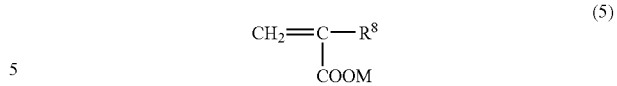

(5)

In the above general formula (5), $R^8$ represents a hydrogen atom or a methyl group, and M represents a hydrogen atom, a metal atom, an ammonium group or an organic ammonium group (a protonated organic amine).

Suitable as the metal atom M in the above general formula (5) are univalent metal atoms, for example alkali metal atoms such as lithium, sodium and potassium; bivalent metal atoms, for example alkaline earth metal atoms such as calcium and magnesium; and trivalent metal atoms such as aluminum and iron. Suitable as the organic ammonium group are alkanolamine groups such as an ethanolamine group, diethanolamine group and triethanolamine group, and a triethylamine group. Further, it may be an ammonium group. Suitable as such unsaturated monocarboxylic acid monomer are acrylic acid, methacrylic acid, crotonic acid and the like; monovalent metal salts, divalent metal salts, ammonium salts and organic ammonium salts thereof, and so forth. Among these, methacrylic acid; monovalent metal salts, divalent metal salts, ammonium salts and organic ammonium salts thereof and the like are preferably used and suitable as the unsaturated carboxylic acid monomer (b) from the viewpoint of improved cement dispersing ability.

The above-mentioned unsaturated dicarboxylic acid monomer may be any of those monomers which have one unsaturated group and two groups capable of forming a carbanion within the molecule. Suitable are maleic acid, itaconic acid, citraconic acid, fumaric acid and the like, and monovalent metal salts, divalent metal salts, ammonium salts and organic ammonium salts thereof, or anhydrides thereof. In addition to these, also suitable as the above unsaturated carboxylic acid monomer (b) are half esters of unsaturated dicarboxylic acid monomers with an alcohol containing 1 to 22 carbon atoms, half amides of unsaturated dicarboxylic acids with an amine containing 1 to 22 carbon atoms, half esters of unsaturated dicarboxylic acid monomers with a glycol containing 2 to 4 carbon atoms, and half amides of maleamic acid with glycols containing 2 to 4 carbon atoms, and so forth.

Suitable as the above unsaturated carboxylic acid monomers (b) are also a compound represented by the following general formula (6):

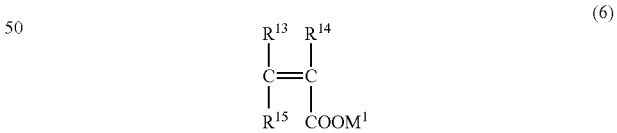

(6)

In the above general formula (6), $R^{13}$, $R^{14}$ and $R^{15}$ may be the same or different and each represents a hydrogen atom, a methyl group, or a group represented by —$(CH_2)_zCOOM^2$, a group represented by —$(CH_2)_zCOOM^2$ may form an anhydride with —$COOM^1$ or the other group represented by —$(CH_2)_zCOOM^2$. $M^1$ and $M^2$ may be the same or different and each represents a hydrogen atom, an alkali metal atom, an alkaline earth metal atom, an ammonium group or an organic ammonium group. Z in —$(CH_2)_zCOOM^2$ is a number of 0 to 2.

Suitable as the alkali metal atoms in the above metal atom $M^1$ and $M^2$ are lithium, sodium and potassium and the like, suitable as the alkaline earth metal atoms are calcium and magnesium and the like. Suitable as the organic ammonium group in the above metal atom $M^1$ and $M^2$ are the same as M mentioned above referring to the general formula (5).

As polycarboxylic acid polymers (A) in cement admixtures of the present invention, the following are desirable.

A cement admixture comprising a polycarboxylic acid polymer and a nitrogen atom-containing compound having non-amide bond, wherein said polycarboxylic acid polymer has a moiety represented by the following general formula (1):

in the formula, $R^1$ represents a hydrogen atom or a hydrocarbon group containing 1 to 20 carbon atoms, $R^a$ may be the same or different and each represents an alkylene group containing 2 to 18 carbon atoms, and r represents the average molar number of addition of the oxyalkylene group represented by $R^aO$ and is a number of 40 to 300.

In the above general formula (1), $R^1$ and $R^a$ are respectively the same as $R^9$ and $R^d$ described hereinabove referring to the general formula (4).

In the above general formula (1), r represents the average molar number of addition of the oxyalkylene group represented by $R^aO$ and is a number of 40 to 300. If r is less than 40, the water-reducing performance of the above-mentioned cement admixture will decrease and, if r exceeds 300, the viscosity after blending with cement will increase, possibly leading to poor workability. A preferred range of r is not less than 50 but not more than 200, more preferably not less than 80 but not more than 130.

The polycarboxylic acid polymer having a moiety represented by the above general formula (1) is judiciously produced by copolymerizing a monomer component comprising, as essential constituents, a compound represented by the general formula (4) as the polyalkylene glycol unsaturated monomer (a) and a compound represented by the general formula (6) as the unsaturated carboxylic acid monomer (b). Preferred as such are polymers having, as essential constituent units, a constituent unit (①-1) represented by the general formula (7) given below and a constituent unit (②-1) represented by the general formula (8) given below.

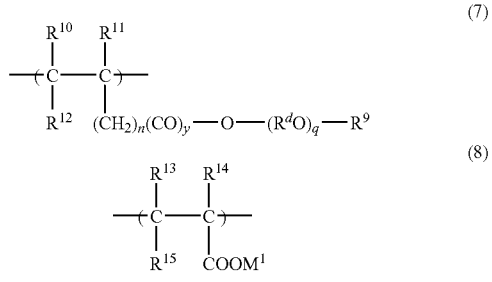

In the above general formulas (7) and (8), $R^9$, $R^{10}$, $R^{11}$, $R^{12}$, $R^{13}$, $R^{14}$ $R^{15}$, $R^d$, $M^1$, q, y and n are respectively the same as $R^9$, $R^{10}$, $R^{11}$, $R^{12}$, $R^{13}$, $R^{14}$, $R^{15}$, $R^d$, $M^1$, q, y and n described hereinabove referring to the general formula (4) and (6).

The polycarboxylic acid having a moiety represented by the general formula (1) can be used most preferably in the cement admixtures of the form (I-1) mentioned above.

The above-mentioned nitrogen atom-containing compound having non-amide bond (B) may be any of the compounds having non-amide bond which containing, as an essential constituent(s), a nitrogen atom or atoms other than the nitrogen atom of amide bond. Suited for use is at least one compound selected from the groups consisting of polyvinylpyrrolidone (B-1), compounds resulting from addition of ethyleneimine to each end of a polyalkylene oxide (B-2), products of grafting of ethyleneimine onto polyalkylene oxides (B-3), amine-alkylene oxide adducts (B-4), polyalkyleneimines (B-5), and polyalkyleneimine-alkylene oxide adducts (B-6). Among these, polyvinylpyrrolidone (B-2), polyalkyleneimines (B-5), or polyalkyleneimine-alkylene oxide adducts (B-6) are preferably used, and the use of a polyalkyleneimine-alkylene oxide adduct (B-6) as an essential constituent is preferred. These can be used each independently or in a combination of two or more species. The compound (B) may have or is free of a polymerizable unsaturated double bond. Such compounds may be used in combination.

The above-mentioned polyvinylpyrrolidone (B-1) is preferably a copolymer comprising the repeating unit represented by the following general formula (9):

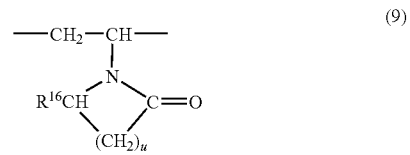

In the above general formula (9), $R^{16}$ represents a hydrogen atom or a methyl group, and u represents an integer of 2 to 4. Suitable as the monomer giving such repeating unit represented by the general formula (9) are N-vinyl-2-pyrrolidone, N-vinyl-5-methyl-2-pyrrolidone, N-vinyl-2-piperidone, N-vinyl-6-methyl-2-piperidone, N-vinyl-ϵ-caprolactam, N-vinyl-7-methyl-ϵ-caprolactam, and the like. Among these, N-vinyl-2-pyrrolidone and N-vinyl-5-methyl-2-pyrrolidone are preferred.

Preferred as the above-mentioned compound (B-2) resulting from addition of ethyleneimine to both ends of a polyalkylene oxide are compounds obtained by polymerizing one or two or more of alkyleneimines containing 2 to 8 carbon atoms on both terminal hydroxyl groups of a polymer of one or two or more alkylene oxides containing 2 to 18 carbon atoms, preferably ethylene oxide, propylene oxide or/and butylene oxide, preferably of a polymer mainly composed of ethylene oxide. Preferred among others are polymers containing ethyleneimine as the main constituent.

Preferred as the above-mentioned products (B-3) of ethyleneimine grafting onto polyalkylene oxides are compounds obtained by graft polymerization of one or more of alkyleneimines containing 2 to 8 carbon atoms on methylene hydrogen atoms of a polymer of one or more alkylene oxides containing 2 to 18 carbon atoms, preferably ethylene oxide, propylene oxide or/and butylene oxide, preferably of a polymer mainly composed of ethylene oxide. Preferred among others are polymers containing ethyleneimine as the main constituent.

The amine-alkylene oxide adducts (B-4) mentioned above may be any compounds having a structure resulting from binding of an oxyalkylene group(s) to an amine residue. Among others, alkylamine-alkylene oxide adducts in which the amine residue is an alkylamine residue are preferred.

The term "amine residue" means a group having a structure resulting from removal of a hydrogen atom (active hydrogen atom) on the nitrogen atom of an amine but is not particularly limited to some or other group formed upon reaction with an amine.

Preferred forms of the above amine-alkylene oxide adducts (B-4) are compounds whose amine residue is constituted of three kinds of element, namely carbon, hydrogen and nitrogen. Among the amine-alkylene oxide adducts (B-4), those having a polymerizable unsaturated double bond are amine-alkylene oxide adduct monomers which are members of the nitrogen atom-containing monomer having non-amide bond (c) to be mentioned later herein. Suitable as those having no polymerizable unsaturated double bond are compounds obtained by addition of an alkylene oxide(s) to an amine.

Suited for use as the amine mentioned above are alkylamines such as methylamine, ethylamine, ethylenediamine, diethylenetriamine, triethylenetetramine, propylamine, butylamine, 2-ethylbutylamine, octylamine, dimethylamine, dipropylamine, dimethylethanolamine, dibutylamine, trimethylamine, triethylamine, cyclobutylamine, cyclohexylamine and laurylamine; alkyleneamines such as allylamine; aromatic amines such as aniline and diphenylamine; nitrogen compounds such as ammonia, urea, thiourea, and the like. These may be used singly or two or more of them may be used in combination. In the present invention, alkylamines are preferred among others, and $C_8$-$C_{18}$ alkylamines such as laurylamine are more preferred. Such compounds form amine residues of the amine-alkylene oxide adducts.

As such alkylene oxide adducts, alkylene oxides such as ethylene oxide, propylene oxide, butylene oxide, isobutylene oxide, 1-butene oxide and 2-butene oxide are preferred, these may comprise one single species or two or more species. Among such alkylene oxide adducts, ethylene oxide, propylene oxide and butylene oxide adducts are more preferred. Still more preferably, it contains ethylene oxides as the main component.

The alkylene oxide can be added to the above-mentioned amine by polymerizing the alkylene oxide onto the amine in a conventional manner, preferably using an acid catalyst or alkali catalyst. Suitable acid catalysts are metal and semimetal halides, which are Lewis acid catalysts, such as boron trifluoride; and mineral acids such as hydrogen chloride, hydrogen bromide and sulfuric acid. Suitable alkali catalysts are potassium hydroxide, sodium hydroxide and sodium hydride.

The above-mentioned amine-alkylene oxide adduct (B-4) has a group formed by one oxyalkylene group or a group (polyalkylene glycol chain) resulting from addition of two or more oxyalkylene groups. The group resulting from addition of two or more oxyalkylene groups is formed by one or two or more oxyalkylene group species and, when it is formed by two or more oxyalkylene groups, the two or more oxyalkylene group species may be in any addition mode, for example in the random, block or alternating addition mode. In cases where a plurality of groups formed by the oxyalkylene group(s) occur in one and the same molecule, they may be the same or different.

That terminus of the oxyalkylene group which is not bound to the amine residue has a structure bound to a hydrogen atom, a univalent metal atom, a bivalent metal atom, an ammonium group, an organic ammonium group, a hydrocarbon group containing 1 to 30 carbon atoms, an oxohydrocarbon group, an amidohydrocarbon group, a carboxylhydrocarbon group, or a sulfonyl(hydrocarbon) group containing 0 to 30 carbon atoms, for instance. In cases where two or more oxyalkylene groups occur in one and the same molecule, their terminal structures may be the same or different. Among such terminal structures, structures bound to a hydrogen atom or a hydrocarbon group containing 1 to 30 carbon atoms are preferred, and structures bound to a hydrogen atom or a hydrocarbon group containing 1 to 10 carbon atoms, in particular an alkyl or alkylene group, are more preferred.

The group formed by the above-mentioned oxyalkylene group(s) is preferably a group mainly formed of an oxyethylene group(s). In this case, "mainly" means that when two or more oxyalkylene group species occur in the monomer, the oxyethylene group accounts for a majority relative to the number of all the oxyalkylene groups occurring.

When the oxyethylene group accounts for "a majority", in the above sense, of the above oxyalkylene groups, the proportion thereof as expressed in terms of mole % relative to 100 mole % of all the oxyalkylene groups is preferably 50 to 100 mole %. If it is less than 50 mole %, the hydrophilicity of the group formed by the oxyalkylene groups may possibly decrease. More preferably, it is not less than 60 mole %, still more preferably not less than 70 mole %, especially preferably not less than 80 mole %, most preferably not less than 90 mole %.

As regards the above-mentioned amine-alkylene oxide adducts (B-4), the average molar number of addition of the oxyalkylene group(s) is preferably above 0 but not more than 300. More preferably, it is not less than 0.5, still more preferably not less than 1, especially preferably not less than 3, most preferably not less than 5, but more preferably not more than 270, still more preferably not more than 250, especially preferably not more than 220, most preferably not more than 200. If the average molar number of addition of the oxyalkylene groups in the amine-alkylene oxide adducts (B-4) are outside such range, the cement admixtures may possibly fail to fully produce its functional effects in improving the fluidity of cement compositions and the like. The above-mentioned average molar number of addition means the average value for the molar number of the oxyalkylene group(s) in question added in each mole of the group formed by the oxyalkylene group(s) of amine-alkylene oxide adducts (B-4), or the average value for the molar number of the oxyalkylene group(s) in question added to each mole of hydrogen atoms (active hydrogen atoms) on nitrogen atoms of the amine which is to form the amine-alkylene oxide adducts (B-4).

The above-mentioned amine-alkylene oxide adducts (B-4) preferably has a weight average molecular weight of not lower than 300 but not higher than 50000, more preferably not lower than 400, still more preferably not lower than 500, but, more preferably not higher than 30000, still more preferably not higher than 10000, further more preferably not higher than 5000.

Suited for use as the compound having no polymerizable unsaturated double bond among the above-mentioned polyalkyleneimine (B-5) are alkyleneimine homopolymers and copolymers obtained by polymerization, in the conventional manner, of one or two or more of alkyleneimines containing 2 to 8 carbon atoms, such as ethyleneimine, propyleneimine, 1,2-butyleneimine, 2,3-butyleneimine and 1,1-dimethylethyleneimine, etc. More preferably, it is polyalkyleneimine polymers mainly formed of the ethyleneimine. In these above alkyleneimine homopolymers and copolymers, which forms the polyalkyleneimine chain may have any of the straight chain structure, branched chain structure and three-dimensionally crosslinked structure. Furthermore, ethylenediamine, diethylenetriamine, triethylenetetramine, tetraethylenepentamine or the like may also be used. Such a polyalkyleneimine generally has, within its structure, an active hydrogen atom-containing primary amino or secondary amino (imino) group in addition to a tertiary amino group. The polyalkyleneimine preferably has a weight average molecular weight of 100 to 100,000, more preferably 300 to 50,000, still more preferably 600 to 10,000.

Among the polyalkyleneimines (B-5) mentioned above, those having a polymerizable unsaturated double bond are not particularly restricted but include polyalkyleneimines having a polymerizable unsaturated bond, for example, those which can be obtained by reacting the above-mentioned polyalkyleneimines having no polymerizable unsaturated double bond with an unsaturated compound having a functional group reactive with the amino or imino group of said polyalkyleneimines.

Suited for use as the above unsaturated compound are unsaturated carboxylic acids such as (meth)acrylic acid, maleic acid, fumaric acid and citraconic acid; unsaturated carboxylic acid anhydrides such as (meth)acrylic anhydride and maleic anhydride; unsaturated carboxylic acid halides such as (meth)acrylic chloride; unsaturated carboxylic acid esters such as alkyl (meth)acrylates which have an alkyl group containing 1 to 30 carbon atoms, maleic acid monoesters which have an alkyl group containing 1 to 30 carbon atoms and maleic acid diesters which have an alkyl group containing 1 to 30 carbon atoms; and epoxy compounds such as glycidyl (meth)acrylate and (meth)allyl glycidyl ether. These may be used singly or two or more of them may be used in combination.

The above-mentioned polyalkyleneimine-alkylene oxide adduct (B-6) may be any oxyalkylene group-containing polyalkyleneimine but, when it has no polymerizable unsaturated double bond, it is preferably one resulting from addition of an alkylene oxide(s) to the nitrogen atom(s) of the amino and/or imino group(s) of such a polyalkyleneimine having no polymerizable unsaturated double bond as mentioned above.

Among the above polyalkyleneimine-alkylene oxide adducts (B-6) mentioned above, those having a polymerizable unsaturated double bond are preferably one obtained by reacting the hydroxyl, amino and/or imino groups of the above-mentioned polyalkyleneimine-alkylene oxide adduct having no polymerizable unsaturated double bond with an unsaturated compound having a functional group reactive with such groups. The nitrogen atoms of the amino and/or imino groups to which an alkylene oxide is to be added have an active hydrogen atom(s).

Available and suitable for introducing an unsaturated group(s) into the above-mentioned polyalkyleneimine-alkylene oxide adduct having no polymerizable unsaturated double bond are, for example, the unsaturated group introducing method comprising subjecting the hydroxyl group(s) of the polyalkyleneimine-alkylene oxide adduct having no polymerizable unsaturated double bond to transesterification with an unsaturated compound such as a (meth)acrylic acid or a (meth)acrylic acid alkyl ester, the unsaturated group introducing method comprising amidating the amino group of the polyalkyleneimine-alkylene oxide adduct having no polymerizable unsaturated double bond with an unsaturated compound such as (meth)acrylic acid or a (meth)acrylic acid alkyl ester, and the unsaturated group introducing method comprising reacting the hydroxyl group(s) of the polyalkyleneimine-alkylene oxide adduct having no polymerizable unsaturated double bond with an epoxy compound such as glycidyl (meth)acrylate or (meth)allyl glycidyl ether.

Suitable example of the alkylene oxide to be added to the above-mentioned polyalkyleneimine include, in addition to those alkylene oxides mentioned above, alkylene oxides containing 2 to 8 carbon atoms, such as trimethylethylene oxide, tetramethylethylene oxide, tetramethylethylene oxide, butadiene monoxide and octylene oxide and, further, aliphatic epoxides such as dipentaneethylene oxide and dihexaneethylene oxide; alicyclic epoxides such as trimethylene oxide, tetramethylene oxide, tetrahydrofuran, tetrahydropyran and octylene oxide; and aromatic epoxides such as styrene oxide and 1,1-diphenylethylene oxide. These may be used singly or two or more of them may be used in combination.

Shown below, as an example of the reaction formula for obtaining the compound which has a polymerizable unsaturated double bond among the above-mentioned polyalkyleneimine-alkylene oxide adducts (B-6), is the reaction formula according to which polyethyleneimine is synthesized from ethyleneimine using an initiator, a polyethyleneimine-ethylene oxide adduct is then produced by addition of ethylene oxide to nitrogen atoms bearing active hydrogen atom(s) of the polyethyleneimine and the transesterification reaction with methacrylic acid is carried out. There is also available the method which comprises synthesizing polyethyleneimine, then causing ethylene oxide to add to nitrogen atoms bearing active hydrogen atom(s) of the polyethyleneimine and then reacting the resulting polyethyleneimine-ethylene oxide adduct with glycidyl methacrylate.

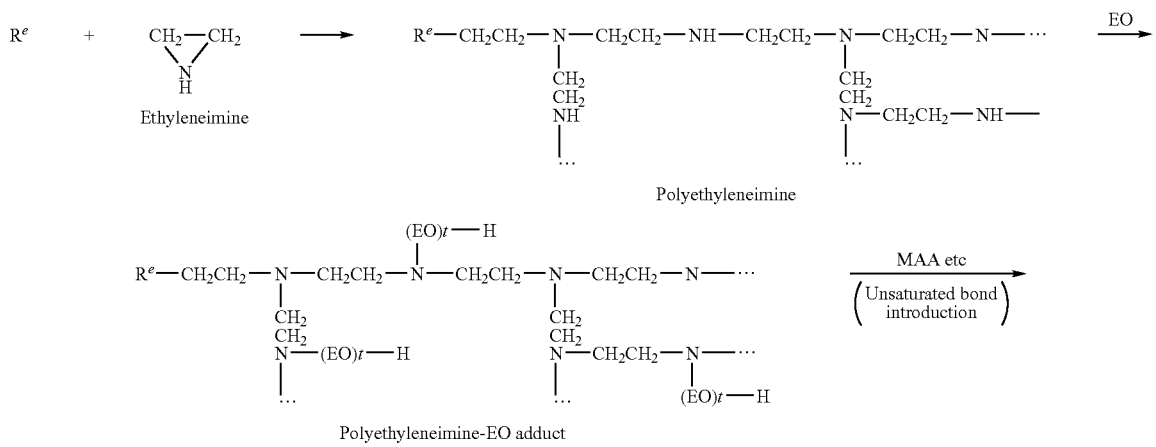

-continued

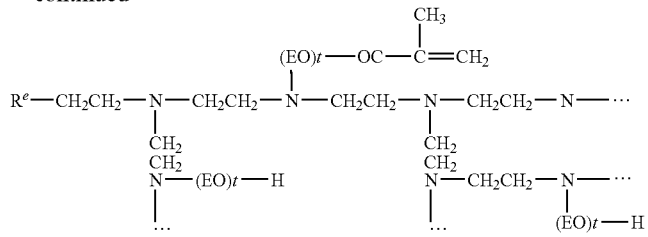

In the above reaction formula, $R^e$ represents an initiator, EO represents ethylene oxide, -(EO)t-H indicates that the group is a result of addition of t ethylene oxide molecules to nitrogen atoms bearing active hydrogen atom(s) of the polyethyleneimine, and MAA represents methacrylic acid. The symbol "..." in the chemical formula means that the polymer chain continues in the same manner.

The above-mentioned polyalkyleneimine (B-5) or polyalkyleneimine-alkylene oxide adducts (B-6) have a polyalkyleneimine chain. Preferably, such polyalkyleneimine chain is mainly formed of ethyleneimine. In this case, "mainly" means that when the polyalkyleneimine chain is made of two or more alkyleneimines, the alkyleneimine in question accounts for a majority relative to the molar number of all the alkyleneimines. In the present invention, when it is ethyleneimine that accounts for a majority of the polyalkyleneimine chain-forming alkyleneimines, the polycarboxylic acid polymer is provided with improved hydrophilicity and thus can produce its functional effects satisfactorily, so that the use of ethyleneimine as a polyalkyleneimine chain-forming alkyleneimine in an extent sufficient to produce the above functional effects results in its accounting for "a majority" so referred to above, hence that chain is "mainly" formed thereof.

When ethyleneimine accounts for "a majority", in the above sense, of the above-mentioned polyalkyleneimine chain-forming alkyleneimines, the proportion thereof as expressed in terms of mole % per 100 mole % of all the alkyleneimines is preferably 50 to 100 mole %. If it is less than 50 mole %, the hydrophilicity of the polyalkyleneimine chain may possibly decrease. More preferably, it is 60 to 100 mole %, still more preferably is 70 to 100 mole %, especially preferably is 80 to 100 mole %, most preferably is 90 to 100 mole %.

As regards the above-mentioned polyalkyleneimine (B-5) or polyalkyleneimine-alkylene oxide adducts (B-6), the average number of polymerization of the alkyleneimine in each polyalkyleneimine chain is preferably, for example, 2 to 300. If it is less than 2, the functions of the polyalkyleneimine (B-5) or polyalkyleneimine-alkylene oxide adducts (B-6) may not be fully performed and, if it exceeds 300, the polymerizability of the polyalkyleneimine(B-5) or polyalkyleneimine-alkylene oxide adducts (B-6) may possibly decrease. More preferably, it is 2 to 200, still more preferably 2 to 100, further still more preferably 2 to 75, especially preferably 3 to 75, most preferably 3 to 50. In this case, the average number of polymerization of diethylenetriamine is regarded as 2 and the average number of polymerization of triethylenetetramine is regarded as 3.

The above-mentioned polyalkyleneimine-alkylene oxide adduct (B-6) has a group or groups formed by one oxyalkylene group or a group or groups resulting from addition of two or more oxyalkylene groups. The group or groups resulting from addition of two or more oxyalkylene groups are composed of one or two or more oxyalkylene group species and, when they are composed of two or more oxyalkylene group species, the two or more oxyalkylene group species may be in any addition mode, for example in a random, block or alternating addition mode. In cases where a plurality of groups formed by the above-mentioned oxyalkylene group(s) occur in one and the same molecule, they may be the same or different.

The above-mentioned group formed by an oxyalkylene group(s) is preferably one mainly composed of an oxyethylene group(s). In that case, the term "mainly" and the average number of addition of oxyalkylene groups in the polyalkyleneimine-alkylene oxide adduct (B-6) have respectively the same meanings as defined hereinabove referring to the aminealkylene oxide adduct (B-4).

The above-mentioned polyalkyleneimine (B-5) and polyalkyleneimine-alkylene oxide adduct (B-6) each preferably has a weight average molecular weight of 600 to 50,000, more preferably 1,000 to 30,000, still more preferably 1,500 to 20,000, further preferably 2,000 to 10,000.

Suited for use as the polycarboxylic acid polymer resulting from copolymerization using a nitrogen atom-containing monomer having non-amide bond (D) are polymers resulting from copolymerization of a monomer component comprising, as essential constituents, a polyalkylene glycol unsaturated monomer (a), an unsaturated carboxylic acid monomer (b) and a nitrogen atom-containing monomer having non-amide bond (c). Preferred embodiments are polymers resulting from copolymerization of a monomer component comprising, as essential constituents, 98-40% by mass of a polyalkylene glycol unsaturated monomer (a), 1-50% by mass of an unsaturated carboxylic acid monomer (b) and 1-50% by mass of a nitrogen atom-containing monomer having non-amide bond (c).

In the following, the nitrogen atom-containing monomer having non-amide bond (c) is referred to also as "monomer (c)".

The above-mentioned monomers which are to constitute the polycarboxylic acid polymer resulting from copolymerization using a nitrogen atom-containing monomer having non-amide bond (D) each may comprise a single species or a combination of two or more species. If the mass proportions of one or more of these monomers are outside the respective ranges mentioned above, the repeating units formed by the respective monomers may fail to produce their functions effectively, hence the effects of the present invention may possibly be no more produced to a satisfactory extent. The mass proportions of the monomers (a), (b) and (c) in the monomer component to form the above polycarboxylic acid polymer (D) are percentages by mass as expressed by taking the sum of the masses of the monomers (a), (b) and (c) as 100% by mass. In the present invention, another or other monomers may be used in addition to the above-mentioned monomers, as described later herein. In cases where such another or other monomers are used, it is preferred that the sum of the monomers (a), (b) and (c) account for the majority in the monomer component.

Among the nitrogen atom-containing compound having non-amide bonds (B), the above-mentioned nitrogen atom-containing monomer having non-amide bond (c) has a polymerizable unsaturated double bond and preferably is an amine-alkylene oxide adduct monomer, which is an unsaturated monomer having a structure resulting from bonding of an oxyalkylene group(s) to an amine residue and more preferably is an alkylamine-alkylene oxide adduct monomer whose amine residue is an alkylamine reside.

The above amine-alkylene oxide adduct monomer can suitably be produced by a method of introducing a polymerizable unsaturated group into a compound resulting from addition of an alkylene oxide to the above-mentioned amine (amine-alkylene oxide adduct having no polymerizable unsaturated double bond).

Suited for use as the method of introducing an unsaturated group into the amine-alkylene oxide adduct are, among others, the unsaturated group introducing method comprising esterifying or transesterifying the hydroxyl group(s) of the amine-alkylene oxide adduct with (meth)acrylic acid or a (meth)acrylic acid alkyl ester such as methyl (meth)acrylate, the unsaturated group introducing method comprising reacting the hydroxyl group(s) of the amine-alkylene oxide adduct with an epoxy compound containing 4 to 10 carbon atoms, such as glycidyl (meth)acrylate or (meth)allyl glycidyl ether, and the unsaturated group introducing method comprising etherification with an alkenylic acid halide containing 3 to 10 carbon atoms, such as (meth)acryloyl chloride, or an alkenyl halide compound containing 3 to 10 carbon atoms, such as (meth)allyl chloride.

Suited for use as the above unsaturated compound for introducing an unsaturated group(s) are unsaturated carboxylic acids such as (meth)acrylic acid, maleic acid, fumaric acid and citraconic acid; unsaturated carboxylic acid anhydrides such as (meth)acrylic anhydride and maleic anhydride; unsaturated carboxylic acid halides such as (meth)acrylic chloride; unsaturated carboxylic acid esters such as alkyl (meth)acrylates which have an alkyl group containing 1 to 30 carbon atoms, maleic acid monoesters which have an alkyl group containing 1 to 30 carbon atoms and maleic acid diesters which have an alkyl group containing 1 to 30 carbon atoms; and epoxy compounds such as glycidyl (meth)acrylate and (meth)allyl glycidyl ether. These may be used singly or two or more of them may be used in combination. In particular, the unsaturated group of the alkenyl compound is preferably an unsaturated group containing 4 or more carbon atoms, more preferably an unsaturated group containing 5 or more carbon atoms. The methallyl and isoprenyl (3-methyl-3-butenyl) groups are preferred to the allyl group. Further, the (meth) acryloyl group is also preferred.

The above-mentioned amine-alkylene oxide adduct. monomer has a group(s) resulting from addition of one oxyalkylene group or a groups(s) resulting from addition of two or more oxyalkylene groups (polyalkylene glycol chain(s)). As for the oxyalkylene group(s) and the preferred forms thereof, the same shall apply as described hereinabove referring to the amine-alkylene oxide adduct having no polymerizable unsaturated double bond.

The average molar number of addition of the oxyalkylene group(s) in the above-mentioned amine-alkylene oxide adduct is preferably above 0 but not more than 300. If the average molar number of addition of the oxyalkylene group (s) exceeds 300, the polymerizability of the monomer may possibly decrease. More preferably, it is not less than 0.5, still more preferably not less than 1, especially preferably not less than 3, most preferably not less than 5. On the other hand, it is more preferably not more than 270, still more preferably not more than 250, especially preferably not more than 220, most preferably not more than 200. If the average molar number of addition of the oxyalkylene group(s) in the amine-alkylene oxide adduct monomer is outside such range, the resulting polycarboxylic acid polymer (D) may possibly fail to produce its effects of improving the fluidity of cement compositions. The average molar number of addition as referred to above means the mean value for numbers of moles of the oxyalkylene group(s) added in each mole of the group formed by the oxyalkylene group(s) in the amine-alkylene oxide adduct, or the mean value for numbers of moles of the oxyalkylene group(s) added to each mole of hydrogen atoms (active hydrogen atoms) on the nitrogen atoms of the amine which is to form the amine-alkylene oxide adduct monomer.

As the weight average molecular weight of the above-mentioned amine-alkylene oxide adduct monomer, the same can be applied as described for the amine-alkylene oxide adduct having no polymerizable unsaturated double bond.

The above-mentioned polyhydric alcohol-alkylene oxide adduct (F) may be any of those compounds which have a structure resulting from binding of an oxyalkylene group(s) to a polyhydric alcohol. It may have or may not have a polymerizable double bond and these may be used in combination of two or more species.

The polyhydric alcohol residue mentioned above means a group having a structure such that an active hydrogen atom(s) is(are) removed from a hydroxyl group(s) of a polyhydric alcohol but is not particularly limited to groups formed upon reaction with the polyhydric alcohol. As for the alkylene oxide(s) to be added to the hydroxyl group(s) of the polyhydric alcohol, the same ones as those mentioned hereinabove may be mentioned.

Among the polyhydric alcohol-alkylene oxide adducts (F) above-mentioned, those having a polymerizable double bond are preferably such polyhydric alcohol-alkylene oxide adduct monomers (d) as mentioned later herein. In the adduct having no polymerizable unsaturated bond, the above-mentioned polyhydric alcohol is not particularly restricted but may be any compound having, on an average, three or more hydroxyl groups in each molecule. Included in a preferred embodiment are compounds whose polyhydric alcohol residue is constituted of three elements, namely carbon, hydrogen and oxygen.

The number of hydroxyl groups of the above polyhydric alcohol is preferably not less than 3 and preferably not more than 300. If it is less than 3, the function of the polyhydric alcohol-alkylene oxide adduct (F) may not be fully performed and, if it exceeds 300, the viscosity of concrete may possibly increase. More preferably, it is not less than 4, still more preferably not less than 5, especially preferably not less than 6. It is more preferably not more than 100, still more preferably not more than 50, especially preferably not more than 25.

Suited for use as the above-mentioned polyhydric alcohol are polyglycidol, glycerin, polyglycerin, trimethylolethane, trimethylolpropane, 1,3,5-pentatriol, erythritol, pentaerythritol, dipentaerythritol, sorbitol, sorbitan, sorbitol-glycerin condensates, adonitol, arabitol, xylitol, mannitol and the like. Also suited for use are saccharides, for example hexose saccharides such as glucose, fructose, mannose, indose, sorbose, gulose, talose, tagatose, galactose, allose, psicose and altrose; pentose saccharides such as arabinose, ribulose, ribose, xylose, xylulose and lyxose; tetrose saccharides such as threose, erythrulose and erythrose; other saccharides such as rhamnose, cellobiose, maltose, isomaltose, trehalose, sucrose, raffinose, gentianose and melezitose; sugar alcohols and sugar acids derived from these (saccharide: glucose; sugar alcohol: glucitol; sugar acid: gluconic acid); and the like. Furthermore, partially etherified or partially esterified derivatives of the compounds specifically mentioned above are also suitable. These may be used singly or two or more of them may be used. Among them, in the present invention, sorbitol and polyglycerin are more suitable.

The polyhydric alcohol residue of the polyhydric alcohol-alkylene oxide adduct (F) is formed from a such compound. As the unsaturated compound, the same ones as those mentioned above can be used singly or two or more of them can be used.

Suitable as the polycarboxylic acid polymer resulting from copolymerization using the above-mentioned polyhydric alcohol-alkylene oxide adduct monomer (E) are polymers resulting from copolymerization of a monomer component comprising, as essential constituents, a polyalkylene glycol unsaturated monomer (a), an unsaturated carboxylic acid monomer (b) and the polyhydric alcohol-alkylene oxide adduct monomer (d). In a preferred embodiment, the polymer (E) is a polymer obtained by copolymerizing a monomer component comprising, as essential constituents, 98 to 40% by mass of the polyalkylene glycol unsaturated monomer (a), 1 to 50% by mass of the unsaturated carboxylic acid monomer (b) and 1 to 50% by mass of the polyhydric alcohol-alkylene oxide adduct monomer.

In the following, the polyhydric alcohol-alkylene oxide adduct monomer (d) is referred to also as "monomer (d)".

The above-mentioned monomers, which are to form the polycarboxylic acid polymer resulting from copolymerization using the polyhydric alcohol-alkylene oxide adduct monomer (E), each may comprise one single species or a combination of two or more species. If one or more of the mass proportions of these monomers are outside the above-mentioned ranges, the repeating units formed by the respective monomers may fail to effectively produce their functions, hence the effects of the present invention may possibly be not produced to a satisfactory extent. The mass proportions of the monomers (a), (b) and (d) in the monomer component to form the polycarboxylic acid polymer (E) are percentages by mass expressed by taking the sum of the masses of the monomers (a), (b) and (d) as 100% by mass. In the present invention, another or other monomers may be used in addition to the above-mentioned monomers, as described later herein. In cases where such another or other monomers are used, it is preferred that the sum of the monomers (a), (b) and (d) account for the majority in the monomer component.

The above-mentioned polyhydric alcohol-alkylene oxide adduct monomer (d) is an unsaturated monomer having a structure resulting from binding of an oxyalkylene group(s) to residue of a polyhydric alcohol. As the method of producing the polyhydric alcohol-alkylene oxide adduct monomer (d), there may be mentioned, for example, (1) the method comprising introducing a compound obtained by addition of an alkylene oxide(s) into a polyhydric alcohol, and (2) the method comprising subjecting not less than 1 mole of glycidol to addition reaction to each mole of an unsaturated alcohol or an unsaturated alcohol-polyalkylene glycol adduct to generate two or more hydroxyl groups in each molecule, followed by addition of an alkylene oxide(s).

In the above method (1), the unsaturated group introduction is preferably effected, for example, by the method comprising esterifying or transesterifying the hydroxyl group(s) of the compound resulting from addition of an alkylene oxide(s) to a polyhydric alcohol with an unsaturated compound such as (meth)acrylic acid or a (meth)acrylic acid alkyl ester such as methyl (meth)acrylate for unsaturated group introduction, the method comprising reacting the hydroxyl group(s) of the compound resulting from addition of an alkylene oxide(s) to a polyhydric alcohol with an epoxy compound containing 2 to 5 carbon atoms, such as glycidyl (meth)acrylate or (meth)allyl glycidyl ether, for unsaturated group introduction, or the method comprising etherifying with an alkenyl halide containing 2 to 5 carbon atoms, such as (meth)allyl chloride for unsaturated group introduction. Suited for use as the above unsaturated compound for introducing an unsaturated group(s) are unsaturated carboxylic acids such as (meth)acrylic acid, maleic acid, fumaric acid and citraconic acid; unsaturated carboxylic acid anhydrides such as (meth)acrylic anhydride and maleic anhydride; unsaturated carboxylic acid halides such as (meth)acrylic chloride; unsaturated carboxylic acid esters such as alkyl (meth)acrylates which have an alkyl group containing 1 to 30 carbon atoms, maleic acid monoesters which have an alkyl group containing 1 to 30 carbon atoms and maleic acid diesters which have an alkyl group containing 1 to 30 carbon atoms; and epoxy compounds such as glycidyl (meth)acrylate and (meth)allyl glycidyl ether. These may be used singly or two or more of them may be used in combination. Particularly, as the unsaturated group(s) of alkenyl compounds, an unsaturated group containing not less than 4 carbon atoms is preferable, more preferably an unsaturated group containing not less than 5 carbon atoms. And methallyl group and isoprenyl(3-methyl-3-butenyl) group are preferable to allyl group. Furthermore, (meth)acryloyl group is also preferable.

The above-mentioned polyhydric alcohol is not particularly restricted but may be any of those compounds which have, on an average, three or more hydroxyl groups in each molecule. A Preferred form is the compound whose polyhydric alcohol residue is constituted of three elements, namely carbon, hydrogen and oxygen.

The above polyhydric alcohol preferably has three or more hydroxyl groups but not more than 300 hydroxyl groups. If the number of such hydroxyl groups is less than 3, the polyhydric alcohol-alkylene oxide adduct monomer (d) may fail to perform its functions to a satisfactory extent. If it exceeds 300, the polymerizability of the polyhydric alcohol-alkylene oxide adduct monomer (d) may possibly decrease. The number of such hydroxyl groups is more preferably not less than 4, still more preferably not less than 5, most preferably not less than 6. On the other hand, it is more preferably not more than 100, still more preferably not more than 50, most preferably not more than 25.

Suited for use as the polyhydric alcohol are polyglycidol, glycerin, polyglycerin, trimethylolethane, trimethylolpropane, 1,3,5-pentatriol, erythritol, pentaerythritol, dipentaerythritol, sorbitol, sorbitan, sorbitol-glycerin condensates, adonitol, arabitol, xylitol, mannitol and the like. Also suited for use are saccharides, for example hexose saccharides such as glucose, fructose, mannose, indose, sorbose, gulose, talose, tagatose, galactose, allose, psicose and altrose; pentose saccharides such as arabinose, ribulose, ribose, xylose, xylulose and lyxose; tetrose saccharides such as threose, erythrulose and erythrose; other saccharides such as rhamnose, cellobiose, maltose, isomaltose, trehalose, sucrose, raffinose, gentianose and melezitose; sugar alcohols and sugar acids derived from these (saccharide: glucose; sugar alcohol: glucitol; sugar acid: gluconic acid); and the like. Furthermore, partially etherified or partially esterified derivatives of the compounds specifically mentioned above are also suitable. These may be used singly or two or more of them may be used. Among them, in the present invention, sorbitol and polyglycerin are more suitable.

The polyhydric alcohol residue of the polyhydric alcohol-alkylene oxide adduct monomer (d) is formed from such a compound. As the unsaturated compound, the same ones as those mentioned above can be used singly or two or more of them can be used.

In the method mentioned above under (2), vinyl alcohol, (meth)allyl alcohol, 3-buten-1-ol, isoprene alcohol (3-methyl-3-buten-1-ol), 3-methyl-2-buten-1,2-methyl-3-buten-2-ol, 2-methyl-2-buten-1-ol, 2-methyl-3-buten-1-ol and the like are suited for use as the unsaturated alcohol. As the unsaturated alcohol-polyalkylene glycol adduct, compounds having a structure such that a polyalkylene glycol chain is added to such unsaturated alcohols can be used.

The above-mentioned polyhydric alcohol-alkylene oxide adduct monomer (d) has a group(s) resulting from addition of one oxyalkylene group or a group(s) resulting from addition of two or more oxyalkylene groups (polyalkylene glycol chain(s)). The group(s) resulting from addition of two or more oxyalkylene groups each is constituted of one or two or more oxyalkylene group species. When two or more oxyalkylene group species are involved, the two or more oxyalkylene group species may be in any of the addition modes including the random, block, alternating and other addition modes. In cases where a plurality of groups formed by the oxyalkylene group(s) mentioned above occur in one molecule, they may be the same or different.

The above-mentioned group formed by an oxyalkylene group(s) is preferably one mainly composed of an oxyethylene group(s), as mentioned hereinabove, whereby the hydrophilicity of the polycarboxylic acid polymer resulting from copolymerization using the polyhydric alcohol-alkylene oxide adduct monomer (E) is improved and the effects of the present invention are fully produced.

Further, the average molar number of addition of the oxyalkylene group(s) in the above-mentioned polyhydric alcohol-alkylene oxide adduct monomer (d) is preferably above 0 but not more than 300. If it exceeds 300, the polymerizability of the monomer may possibly decrease. It is more preferably not less than 0.3, still more preferably not less than 0.5, especially preferably not less than 1, most preferably not less than 2. On the other hand, it is more preferably not more than 270, still more preferably not more than 250, especially preferably not more than 220, most preferably not more than 200. If the average molar number of addition of the oxyalkylene group(s) in the polyhydric alcohol-alkylene oxide adduct monomer (d) is outside such range, the effect of the resulting polycarboxylic acid polymer (E) in improving the fluidity of cement compositions may not be fully produced. The average molar number of addition as referred to above means the mean value for numbers of moles of the oxyalkylene group(s) added in each mole of the group formed by the oxyalkylene group(s) in the polyhydric alcohol-alkylene oxide adduct monomer (d), or the mean value for numbers of moles of the oxyalkylene group(s) added to each mole of the hydroxyl group of the polyhydric alcohol which is to form the polyhydric alcohol-alkylene oxide adduct monomer (d).

In cases where the monomer component to be used in producing the polycarboxylic acid polymer contains an unsaturated monocarboxylic acid monomer, it is preferred that at least one terminus of the oxyalkylene group having a structure bound to the polyhydric alcohol residue in the above-mentioned polyhydric alcohol-alkylene oxide adduct monomer (d) be a hydroxyl group. More preferably, every oxyalkylene group terminus is a hydroxyl group. If at least one oxyalkylene group terminus is an alkyl group, the water-reducing ability of the cement additives comprising the polycarboxylic acid polymer resulting from copolymerization using the polyhydric alcohol-alkylene oxide adduct monomer (E) may possibly decrease.

The above polyhydric alcohol-alkylene oxide adduct monomer (d) preferably has a weight average molecular weight of not less than 500 but not more than 500,000. It is more preferably not less than 1,000, still more preferably not less than 5,000, further preferably not less than 8,000, most preferably not less than 10,000. On the other hand, it is more preferably not more than 300,000, still more preferably not more than 200,000, further preferably not more than 100,000, most preferably not more than 80,000.

The polyamidepolyamine (H) mentioned above may be any compound having two or more amino groups and two or more amide bonds in each molecule. Usable as such compound are polyamidepolyamine having a polymerizable unsaturated bond and polyamidepolyamine having no polymerizable unsaturated bond. These may be used in combination. Suited for use as the polyamidepolyamine having a polymerizable unsaturated bond is that polyamidepolyamine monomer (e) which is to be mentioned later herein. Suited for use as the polyamidepolyamine having no polymerizable unsaturated bond are polyamidepolyamine compounds resulting from addition of 0 to 8 moles of an alkylene oxide(s) containing 2 to 4 carbon atoms to each mole of the sum of the amino and imino groups of the polyamidepolyamine obtained by reacting 1.0 mole of a polyalkylenepolyamine, which is to be mentioned later herein, with 0.8 to 0.95 mole of a dibasic acid and/or an ester of a dibasic acid with an alcohol containing 1 to 4 carbon atoms and 0.05 to 0.18 mole of an ester of an alcohol containing 1 to 4 carbon atoms.

Suitable as the polycarboxylic acid polymer resulting from copolymerization using the above-mentioned polyamidepolyamine monomer (G) are polymers resulting from copolymerization of a monomer component comprising, as essential constituents, a polyalkylene glycol unsaturated monomer (a), an unsaturated carboxylic acid monomer (b) and the polyamidepolyamine monomer (e). A preferred form is a polymer resulting from copolymerization of a monomer component comprising, as essential constituents, 98 to 40% by mass of a polyalkylene glycol unsaturated monomer (a), 1 to 50% by mass of an unsaturated carboxylic acid monomer (b) and 1 to 50% by mass of the polyamidepolyamine monomer (e).

Hereinafter, the polyamidepolyamine monomer (e) is referred to also as "monomer (e)".

The above-mentioned monomers, which are to form the polycarboxylic acid polymer resulting from copolymerization of the polyamidepolyamine monomer (G), each may comprise one single species or a combination of two or more species. If one or more of the mass proportions of these monomers are outside the above-mentioned ranges, the repeating units formed by the respective monomers may fail to effectively produce their functions, hence the effects of the present invention may possibly be not produced to a satisfactory extent. The mass proportions of the monomers (a), (b) and (e) in the monomer component to form the polycarboxylic acid polymer (G) are percentages by mass expressed with taking the sum of the masses of the monomers (a), (b) and (e) as 100% by mass. In the present invention, another or other monomers may be used in addition to the above-mentioned monomers, as described later herein. In cases where such another or other monomers are used, it is preferred that the sum of the monomers (a), (b) and (e) account for the majority in the monomer component.

In the present invention, the polyamidepolyamine monomer (e) may be any polyamidepolyamine having a polymerizable unsaturated bond. Preferred are, however, polyamidepolyamine compounds resulting from addition of 0 to 8 moles of an alkylene oxide(s) containing 2 to 4 carbon atoms to each mole of the sum of the amino and imino groups of the polyamidepolyamine having an unsaturated bond obtained by reacting 1.0 mole of a polyalkylenepolyamine [hereinafter referred to also as "compound (e1)"] with 0.8 to 0.95 mole of a dibasic acid and/or an ester of a dibasic acid with an alcohol containing 1 to 4 carbon atoms [hereinafter such acid or ester is referred to also as "compound (e2)"] and 0.05 to 0.18 mole of (meth)acrylic acid and/or an ester of (meth)acrylic acid with an alcohol containing 1 to 4 carbon atoms [hereinafter referred to also as "compound (e3)"].

The above compound (e1) may be any compound having a plurality of alkylene groups and a plurality of amino and/or imino groups in each molecule. Suitable for use are one or two or more of diethylenetriamine, triethylenetetramine, tetraethylenepentamine, pentaethylenehexamine, dipropylenetriamine, tripropylenetetramine and tetrapropylenepentamine. Among them, diethylenetriamine and triethylenetetramine are preferably used in view of their ready availability and production cost.

Suited for use as the above compound (e2) are one or two or more of malonic acid, succinic acid, fumaric acid, maleic acid, glutaric acid, adipic acid, pimelic acid, phthalic acid, azelaic acid and sebacic acid, and esters of these with an alcohol containing 1 to 4 carbon atoms. Among them, adipic acid is preferably used in view of the ready availability and production cost.

Suited for use as the above compound (e3) are one or two or more of (meth)acrylic acid and (meth)acrylic acid esters with an alcohol containing 1 to 4 carbon atoms, such as methyl (meth)acrylate, ethyl (meth)acrylate, propyl (meth)acrylate and butyl (meth)acrylate.

Suited as the alcohol containing 1 to 4 carbon atoms and serving to form the above compound (e2) or (e3) are one or two or more of methanol, ethanol, propanol and butanol, inclusive of isomers thereof.

The polyamidepolyamine having an unsaturated bond is obtained by reacting the compound (e1) with the compound (e2) and compound (e3), with or without using an additional compound(s) other than these compounds. For obtaining polyamidepolyamine having an unsaturated bond, it is essential to subject the compound (e1), compound (e2) and compound (e3) to condensation polymerization and, in that case, any of the known condensation polymerization techniques can be used. For example, use may be made of the two-step method comprising first subjecting the compound (e1) and compound (e2) to condensation polymerization and then subjecting the resulting polyamidepolyamine and the compound (e3) to condensation polymerization, or the one-step method comprising subjecting, from the beginning, the compound (e1), compound (e2) and compound (e3) simultaneously to condensation polymerization. In these reaction methods, the respective compounds may be subjected to reaction all at once or may be subjected to reaction stepwise or successively. These reaction methods, for instance, lead to the formation of a polyamide chain as a result of the condensation polymerization reaction, namely the amidation reaction, and the resulting polyamidepolyamine has an unsaturated bond from the compound (e3)-derived (meth)acrylic acid residue located at a terminus of the polyamide chain.

The mole ratio among the compound (e1), compound (e2) and compound (e3) to form the above-mentioned polyamidepolyamine having an unsaturated bond is such that the compound (e2) amounts to 0.8 to 0.95 mole and the compound (e3) to 0.05 to 0.18 mole relative to 1.0 mole of the compound (e1). As a result, the product of condensation polymerization of the compound (e1) and compound (e2) becomes a polyamidepolyamine formed by condensation polymerization in a compound (e1)/compound (e2) mole ratio of 5/4 to 20/19 on an average and having a chain length falling within a certain range and, owing to such structure, the polycarboxylic acid polymer resulting from copolymerization using the resulting polyamidepolyamine monomer (G) can exhibit high levels of water-reducing ability and dispersion stability. If the chain length of the polyamidepolyamine is shorter, namely if the compound (e2) amounts to less than 0.8 mole relative to 1.0 mole of the compound (e1), the dispersion stability of the polycarboxylic acid polymer resulting from copolymerization using the polyamidepolyamine monomer (G) may possibly decrease. If the chain length of the polyamidepolyamine is longer, namely if the compound (e2) amounts to more than 0.95 mole relative to 1.0 mole of the compound (e1), the water-reducing ability of the polycarboxylic acid polymer resulting from copolymerization using the polyamidepolyamine monomer (G) may possibly decrease.

Further regarding the mole ratio mentioned above, if the compound (e3) amounts to less than 0.05 mole relative to 1.0 mole of the compound (e1), the rate of incorporation of the polyamidepolyamine monomer (e) into the polycarboxylic acid polymer decreases, so that the function to be performed by the repeating unit formed from the polyamidepolyamine monomer (e) may possibly decrease. If it amounts to more than 0.18 mole, the structure of the polycarboxylic acid polymer resulting from copolymerization using the polyamidepolyamine monomer (G) becomes excessively three-dimensional, so that the effects of the present invention may not be fully produced. As for the molar number of the compound (e3), it is preferred that the compound (e3) amount to 0.1 to 0.17 mole relative to 1.0 mole of the compound (e1).

Addition of 0 to 8 moles of an alkylene oxide(s) containing 2 to 4 carbon atoms to each mole of the sum of the amino and imino groups of the above-mentioned polyamidepolyamine having an unsaturated bond gives a polyamidepolyamine compound (polyamidepolyamine monomer (e)). Suitable as the alkylene oxide(s) containing 2 to 4 carbon atoms to be added to the amino and/or imino group(s) of the polyamidepolyamine having an unsaturated bond are one or two or more of ethylene oxide, propylene oxide and butylene oxide.

In preparing the above-mentioned polyamidepolyamine monomer (e), an alkylene oxide(s) containing 2 to 4 carbon atoms may or may not be, but preferably is(are) caused to add to either the amino group or the amino group(s) or both of polyamidepolyamine having an unsaturated bond. In that case, the alkylene oxide containing 2 to 4 carbon atoms adds to the nitrogen atom(s) bearing active hydrogen atom(s) of the amino and/or imino groups. If the molar number of the alkylene oxide(s) containing 2 to 4 carbon atoms exceeds 8, the molecular weight of the polyamidepolyamine monomer (e) increases and, accordingly, the number of nitrogen atoms in the polycarboxylic acid polymer resulting from copolymerization using the polyamidepolyamine monomer (G) decreases and, as a result, the effects of the present invention cannot be produced to a full extent the molar number of addition of the alkylene oxide(s) containing 2 to 4 carbon atoms is preferably 0.5 to 6.0 moles, more preferably 1.0 to 5.5 moles, relative to 1.0 mole of the sum of the amino and imino groups which the polyamidepolyamine having an unsaturated bond has.

An exemplary reaction formula illustrating the production of the above polyamidepolyamine monomer (e) from the compounds (e1), (e2) and (e3) by two-step condensation polymerization is shown below.

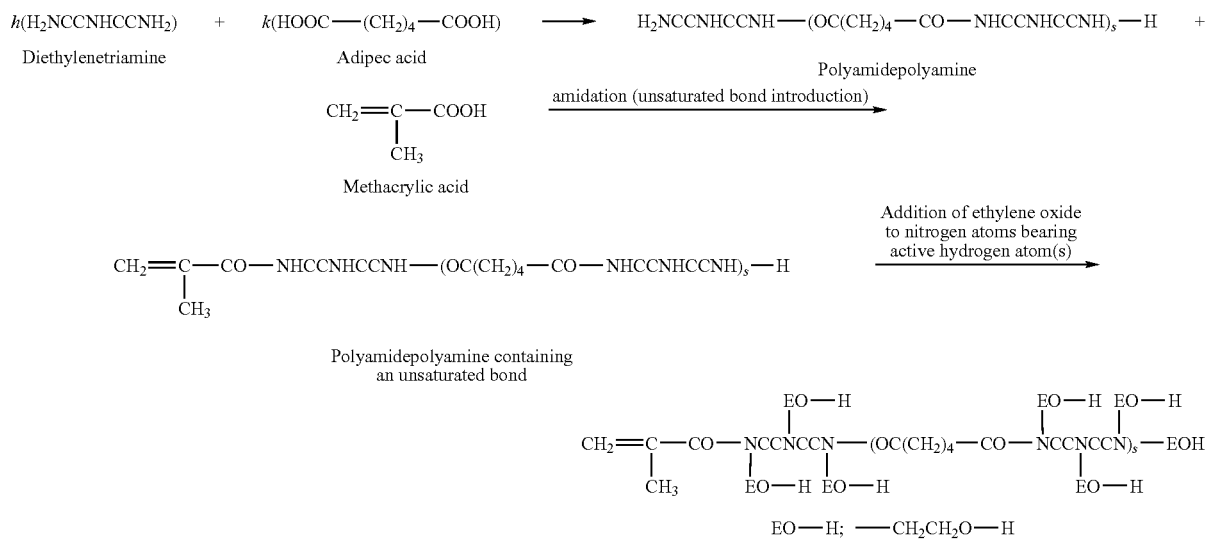

In the above reaction formula, represents ethylene oxide, -EO—H indicates that the group is a result of addition of ethylene oxide to nitrogen atoms bearing active hydrogen atom(s) of the polyamidepolyamine having an unsaturated bond, h represents the molar number of diethylenetriamine, k represents the molar number of adipic acid, and s represents the molar number of the repeating unit formed from adipic acid and diethylenetriamine.

The monomer components forming the above polycarboxylic acid polymer; polycarboxylic acid polymer (A), polycarboxylic acid polymer resulting from copolymerization using a nitrogen atom-containing monomer having non-amide bond (D), polycarboxylic acid polymer resulting from copolymerization using a polyhydric alcohol-alkylene oxide adduct monomer (E) and polycarboxylic acid polymer resulting from copolymerization using a polyamidepolyamine monomer (G) may further contain, where necessary, another monomer(s) (f). Suitable as another monomer(s) (f) are the following. These may be used singly or two or more of them may be used in combination.

Styrenes such as styrene, bromostyrene, chlorostyrene and methylstyrene; dienes such as 1,3-butadiene, isoprene and isobutylene; (meth)acrylic acid esters such as methyl(meth) acrylate, ethyl(meth)acrylate, butyl(meth)acrylate, pentyl (meth)acrylate, hexyl(meth)acrylate, decyl(meth)acrylate and lauryl(meth)acrylate; α-olefins such as hexene, heptene and decene; alkyl vinyl ethers such as methyl vinyl ether, ethyl vinyl ether and butyl vinyl ether; vinyl esters such as vinyl acetate; and allyl esters such as allyl acetate;

diesters derived from the above unsaturated dicarboxylic acid monomers and alcohols containing 1 to 22 carbon atoms, diamides derived from the above unsaturated dicarboxylic acids and amines containing 1 to 22 carbon atoms and diesters derived from the above unsaturated dicarboxylic acid monomers and glycols containing 2 to 4 carbon atoms;

bifunctional (meth)acrylates such as hexanediol di(meth) acrylate, trimethylolpropane tri(meth)acrylate, and trimethylolpropane di(meth)acrylate; unsaturated sulfonic acids, such as vinylsulfonate, (meth)allylsulfonate, 2-(meth)acryloxyethysulfonate, 3-(meth)acryloxypropyl-sulfonate, 3-(meth) acryloxy-2-hydroxypropylsulfonate, 3-(meth)acryloxy-2-hydroxypropylsulfophenyl ether, 3-(meth)acryloxy-2-hydroxypropyloxysulfobenzoate, 4-(meth) acryloxybutylsulfonate, (meth)acrylamidomethyl-sulfonic acid, (meth)acrylamidoethylsulfonic acid, 2-methylpropane-sulfonic acid (meth)acrylamide and styrenesulfonic acid, as well as univalent metal salts, bivalent metal salts, ammonium salts and organic ammonium salts thereof;

unsaturated amides such as (meth)acrylamide, (meth)acrylalkylamides, N-methylol(meth)acrylamide and N,N-dimethyl(meth)acrylamide; allyl compounds such as allyl alcohol; unsaturated amino compounds such as dimethylaminoethyl(meth)acrylate; vinyl ethers and allyl ethers, such as methoxypolyethylene glycol monovinyl ether, polyethylene glycol monovinyl ether, methoxypolyethylene glycol mono(meth)allyl ether and polyethylene glycol mono (meth)allyl ether; (meth)acrylate compounds such as hydroxyethyl (meth)acrylate, hydroxypropyl(meth)acrylate, methoxyethyl(meth)acrylate, ethoxyethyl(meth)acrylate, butoxyethylethyl(meth)acrylate, and methoxypropyl(meth) acrylate.

Now, regarding the method of producing the polycarboxylic acid polymer of the present invention, the method of copolymerizing the monomer components is explained in the following.

As the above copolymerization, any known polymerization method can be used, such as solution polymerization or bulk polymerization using the monomer components and a polymerization initiator. As the polymerization initiator, the known ones can be used and suitable are persulfate salts such as ammonium persulfate, sodium persulfate and potassium persulfate; hydrogen peroxide; azo compounds such as azo-bis-2-methylpropionamidine hydrochloride and azoisobutyronitrile; peroxides such as benzoyl peroxide, lauroyl peroxide and cumene hydroperoxide; and so forth. Further, as the promoter, reducing agents such as sodium hydrogensulfite, sodium sulfite, Mohr's salt, sodium pyrobisulfite, formaldehyde sodium sulfoxylate and ascorbic acid; and amine compounds such as ethylenediamine, sodium ethylenediaminetetraacetate and glycine, etc. can be used in combination. These polymerization initiators and promoters may be used singly or two or more species may be used in combination.

Particularly, the method described below is preferred.

In the above copolymerizing method, initiating the polymerization using hydrogen peroxide and an organic reducing agent is required. By mixing up hydrogen peroxide and an organic reducing agent, polymerization rate can be improved with effective generation of active radical. Moreover, polymer portions with high molecular weight can be increased while inhibiting chain transfer of monomers. Furthermore, hydrogen peroxide and the organic reducing agent are individually preserved until being used, therefore the preservation stabilities are also excellent. The above-mentioned hydrogen peroxide may be used in any forms and can be used in appropriate form depending on the polymerization method. Particularly, from a viewpoint of handling easiness, hydrogen peroxide is preferably used in a form of aqueous solution.

The above hydrogen peroxide is preferably used in an amount of 0.01 to 30 mole %, more preferably 0.1 to 20 mole %, still more preferably 0.5 to 10 mole % relative to the total amount of polymeric monomer. If it is less than 0.01 mole %, the amount of unreactive monomer increases. On the other hand, if it exceeds 30 mole %, polycarboxylic acid with large oligomer portion is obtained, therefore the cases are not preferable. The above-mentioned organic reducing agent is a reducing agent composed of one or more species of atom(s) selected from a group consisting of C, H, O, N, S, P and halogen, or an alkali metal salt or an alkaline earth metal salt thereof, and preferably the one containing one or more carbon atom(s) in the molecule. Specifically, for example, amine compound such as monoethanolamine, diethanolamine, triethanolamine, hydroxylamine, hydroxylamine hydrochloride, hydrazine and the like, or a salt thereof; alkali metal sulfite such as sodium sulfite, sodium hydrogensulfite, methadisulfite; lower oxide such as hypophosphorous acid, sodium hypophosphite, sodium hydrosulfite, sodium dithionite, or a salt thereof; —SH, —SO$_2$H, —NHNH$_2$ or —COCH(OH) group-containing organic compound such as sodium formaldehyde sulfoxylate, sodium hydroxymethanesulfinic acid dihydrate or a salt thereof; invert sugar such as D-fructose, D-glucose, thiourea compound such as thiourea and thiourea dioxide; are included.

In the present invention, using at least one or more species selected from a group consisting of endiol group [—C(OH)=C(OH)—]-containing compound and a derivative thereof, substituted endiol group [—C(OH)=C(OZ)]-containing compound (Z represents a monovalent metal, a bivalent metal, an ammonium group or an organic amino group) as the organic reducing agent is preferable from a reduction efficiency viewpoint. Furthermore, among these, considering from the viewpoint whether it is a strong reducing agent and availability convenience, specifically, L-ascorbic acid, L-sodium ascorbate, L-ascorbate ester, erythorbic acid, sodium erythorbate, erythorbate ester and the like are preferred, for instance. Among these, L-ascorbic acid and erythorbic acid are especially suitable. These may be used singly or two or more of them may be used in combination.

The above organic reducing agent is preferably used in an amount of 0.1 to 500 mole %, more preferably 1 to 200 mole %, still more preferably 1 to 100 mole % relative to hydrogen peroxide. If it is less than 0.1 mole %, the amount of unreactive monomer increases with no sufficient generation of active radical. On the other hand, if it exceeds 500 mole %, the amount of organic reducing agent which does not react with hydrogen peroxide becomes large, therefore the cases are not preferable. In the producing method of polycarboxylic acid according to the present invention, at least one of the above hydrogen peroxide and the above organic reducing agent is preferably charged in a reaction system by dripping. By the charging at least one of hydrogen peroxide and organic reducing agent by dripping over definite time, active radical can be supplied to the reaction system at all times, therefore the amount of unreactive monomers can be decreased. Furthermore, if one of hydrogen peroxide and organic reducing agent is charged by dripping, the other one may be charged by any method. For example, divided charging, batch charging, post-mixing or the like may be used. And when conducting the copolymerization, charging method of the monomer components is not particularly limited, for example, any method of dripping, divided charging, batch charging, post-mixing or the like may be used.

In the above method of copolymerization, a chain transfer agent may be used according to need. Usable as such chain transfer agent are one or two or more species of those known in the art. The use of a hydrophobic chain transfer agent is preferred, however.

In the above method of copolymerization, when the monomer components comprise one or more monomers having an oxyalkylene group, namely the polyalkylene glycol unsaturated monomers (a), a hydrophobic chain transfer agent can be used.

Suitable as the above hydrophobic chain transfer agent are thiol compounds having a hydrocarbon group containing not less than 3 carbon atoms or compounds whose solubility in water at 25° C. is not more than 10%. Suitable are the chain transfer agents mentioned above, thiol chain transfer agents such as butanethiol, octanethiol, decanethiol, dodecanethiol, hexadecanethiol, octadecanethiol, cyclohexyl mercaptan, thiophenol, octyl thioglycolate, octyl 2-mercaptopropionate, octyl 3-mercaptopropionate, 2-ethylhexyl mercaptopropionate, 2-mercaptoethyl octanoate, 1,8-dimercapto-3,6-dioxaoctane, decanetrithiol, and dodecyl mercaptan; halides such as carbon tetrachloride, carbon tetrabromide, methylene chloride, bromoform, and bromotrichloroethane; unsaturated hydrocarbon compounds such as a-methylstyrene dimer, α-terpinene, γ-terpinene, dipentene, and terpinolene; and the like. These may be used singly or two or more species may be used in combination. Among them, thiol chain transfer agents having a hydrocarbon group containing not less than 3 carbon atoms are preferably contained.

The above hydrophobic chain transfer agent may be used in combination with one or two or more hydrophilic chain transfer agents, if necessary. As such hydrophilic chain transfer agents, those known in the art can be used. Suitable as such are thiol chain transfer agents such as mercaptoethanol, thioglycerol, thioglycolic acid, mercaptopropionic acid, 2-mercaptopropionic acid, 3-mercaptopropionic acid, thiomalic acid, and 2-mercaptoethanesulfonic acid; primary alcohols such as 2-aminopropane-1-ol; secondary alcohols such as isopropanol; phosphorous acid, hypophosphorous acid and salts thereof (e.g. sodium hypophosphite, potassium hypophosphite), sulfurous acid, hydrosulfurous acid, dithionous acid, metabisulfurous acid, and salts thereof (e.g. sodium sulfite, sodium hydrogen sulfite, sodium dithionite, sodium metabisulfite, potassium sulfite, potassium hydrogen sulfite, potassium dithionite, potassium metabisulfite), and like lower oxides and salts thereof.

As for the method of adding the above chain transfer agent to the reaction vessel, such a continuous charging method as dripping and divided charging can be applied. The chain transfer agent may be introduced singly into the reaction vessel, or it may be admixed in advance with the monomer having an oxyalkylene group or solvent and/or the like.

The above copolymerization may be carried out either batchwise or continuously. As the solvent which is used where necessary in the step of copolymerization, any of known ones may be used and suitable are water; alcohols such as methyl alcohol, ethyl alcohol and isopropyl alcohol; aromatic or aliphatic hydrocarbons such as benzene, toluene, xylene, cyclohexane and n-heptane; esters such as ethyl acetate; and ketones such as acetone and methyl ethyl ketone. These may be used singly or two or more species may be used in combination. Among them, one or two or more solvents selected from the group consisting of water and lower alcohols containing 1 to 4 carbon atoms are preferably used from the viewpoint of solubility of the monomer components and the product polycarboxylic acid polymer.

As for the method of adding the monomer components, polymerization initiator, etc. to the reaction vessel in the above-mentioned method of copolymerization, suitable are the method comprising charging the reaction vessel with all monomer components and then adding the polymerization initiator thereto to conduct copolymerization; the method comprising charging the reaction vessel with some of monomer components and then adding the polymerization initiator and residual monomer components thereto to conduct copolymerization; and the method comprising charging the reaction vessel with the polymerization solvent and then adding the whole amount of the monomers and polymerization initiator thereto are suitable. Among such methods, the method comprising carrying out the copolymerization by adding dropwise the polymerization initiator and monomers successively to the reaction vessel is preferred since the molecular weight distribution of the product copolymer can be made narrow (sharp) and the cement dispersibility for increasing the fluidity of cement compositions and the like can be improved thereby. Furthermore, the copolymerization reaction is preferably carried out with maintaining the density of water in the reaction vessel during the copolymerization to not more than 50% since the preservation stability of the obtained polymer is more improved by the improvement of the copolymerizability of the monomer components. More preferably, it is not more than 40%, still more preferably not more than 30%.

In the above method of copolymerization, the copolymerization temperature and other copolymerization conditions are appropriately selected according to the copolymerization method, solvent, polymerization initiator, and chain transfer agent employed. It is generally preferred that the copolymerization temperature be not lower than 0° C. and not higher than 150° C. More preferably, it is not lower than 40° C., still more preferably not lower than 50° C., especially preferably not lower than 60° C., while it is more preferably not higher than 120° C., still more preferably not higher than 100° C., especially preferably not higher than 85° C.

The polymer obtained by the above method of copolymerization as such can be used as the main component of cement additives. Where necessary, it may be used after further neutralization with an alkaline substance. Preferably used as the alkaline substance are inorganic salts such as monovalent and divalent metal hydroxides, chlorides and carbonates; ammonia; and organic amines, etc.

In the above method of copolymerization, the copolymerization of the monomer components is preferably carried out at a degree of neutralization of the above unsaturated carboxylic acid monomer (b) of 0 to 60 mole %. The degree of neutralization of the unsaturated carboxylic acid monomer (b) is expressed in terms of the mole % of the unsaturated carboxylic acid monomer (b) in a salt form with the total number of moles of the unsaturated carboxylic acid monomer (b) being taken as 100 mole %. When the degree of neutralization of the unsaturated carboxylic acid monomer (b) exceeds 60 mole %, the degree of polymerization in the copolymerization step will not rise, hence the product polymer may possibly have a lower molecular weight and the production efficiency may possibly decrease. More preferably, it is not more than 50 mole %, still more preferably not more than 40 mole %, still more preferably not more than 30 mole %, especially preferably not more than 20 mole %, most preferably not more than 10 mole %.

Suitable as the method of carrying out the copolymerization using the above unsaturated carboxylic acid monomer (b) at a degree of neutralization of 0 to 60 mole % are the method comprising subjecting the all acid form unsaturated carboxylic acid monomer (b), namely the whole unsaturated carboxylic acid monomer (b) in which M in the above general formula (5) is a hydrogen atom, to copolymerization without neutralization, and the method comprising subjecting the unsaturated carboxylic acid monomer (b) to copolymerization after neutralization with an alkaline substance to the form of a salt, such as sodium salt or ammonium salt and the like, at a degree of neutralization of 0 to 60 mole %.

The polycarboxylic acid polymer (A), polycarboxylic acid polymer resulting from copolymerization using a nitrogen atom-containing monomer having non-amide bond (D), polycarboxylic acid polymer resulting from copolymerization using a polyhydric alcohol-alkylene oxide adduct monomer (E), and polymer resulting from copolymerization using a polyamidepolyamine monomer (G) of the present invention are obtained by copolymerization of the monomer components, as mentioned above. As for the molecular weight of such copolymer, the weight average molecular weight (Mw) as determined by gel permeation chromatography (hereinafter referred to as "GPC") and expressed on the polyethylene glycol equivalent basis is, in case of the above form (I), preferably not less than 3,000 but not more than 500,000. It is more preferably not less than 4,000 but not more than 300,000, still more preferably not less than 5,000 but not more than 100,000. In case of the above form (II) or (III), preferably not less than 500 but not more than 500,000. If it is less than 500, the water-reducing performance of the polycarboxylic acid polymer may possibly decrease and, if it exeeds 500,000, the water-reducing performance and slump loss preventive effect of the polycarboxylic acid polymer may possibly decrease. It is more preferably not less than 4,000 but not more than 300,000, still more preferably not less than 5,000 but not more than 100,000.

In cases where two or more polycarboxylic acid polymers are used, each polycarboxylic acid polymer preferably has a molecular weight of not more than 50,000, more preferably not more than 30,000, still more preferably not more than 25,000. The average molar number of addition of the polyalkylene glycol in each polycarboxylic acid polymer is preferably not more than 100 moles, more preferably not more than 50 moles, still more preferably not more than 30 moles. The difference in the average molar number of addition of the polyalkylene glycol is preferably not less than 3, more preferably not less than 4, still more preferably not less than 5. In a preferred embodiment, the molecular weights of the respective polymers are within the range of 25,000 to 60,000 and, as for the average molar number of addition of the polyalkylene glycol, a combination of not more than 10 and not less than 10, for example 6 moles and 10 moles, is preferred.

When the average molar number of addition of polyalkylene glycol in the above polymer is 40 to 300, as for the molecular weight of polycarboxylic acid polymer, the weight average molecular weight (Mw) as determined by GPC and expressed on the polyethylene glycol equivalent basis is preferably 20,000 to 100,000, more preferably 30,000 to 80,000.

In the present description, the weight average molecular weight of the polymer is a value determined under the GPC measurement conditions given below.

GPC Molecular Weight Measurement Conditions
Column used: Tosoh TSK guard column SWXL+TSK gel G4000SWX +G3000SWXL+G2000SWXL
Eluent: Sodium acetate trihydrate (115.6 g) is dissolved in a mixed solvent composed of 10,999 g of water and 6,001 g of acetonitrile, and the solution is further adjusted to pH 6.0 with acetic acid and used as the solution of the eluent.
Injection volume: 100 µL of the 0.5% solution of the eluent
Eluent flow rate: 0.8 mL/min
Column temperature: 40° C.
Standard samples: Polyethylene glycol, peak-top molecular weights (Mp) 272,500, 219,300, 85,000, 46,000, 24,000, 12,600, 4,250, 7,100, 1,470

Order of Calibration curve: 3rd-order
Detector: Waters, Japan's 410 differential refractive index detector
Analysis software: Waters, Japan's MILLENNIUM Ver. 3.21

The cement admixtures in the above-mentioned forms (I-1) to (I-6) can be produced also by copolymerizing a monomer component comprising, as essential constituents, the above-mentioned polyalkylene glycol unsaturated monomer (a), unsaturated carboxylic acid monomer (b) and nitrogen atom-containing monomer having non-amide bond (c). As for the copolymerization technique, the above-mentioned methods are judiciously used, and the monomer species and amounts thereof in the monomer component and the copolymerization conditions, among others, are adequately selected to give the above-mentioned forms (I-1) to (I-6).

The cement admixtures in the above-mentioned forms (II-1) to (II-3) can be produced also by copolymerizing a monomer component comprising, as essential constituents, the above-mentioned polyalkylene glycol unsaturated monomer (a), unsaturated carboxylic acid monomer (b) and polyhydric alcohol-alkylene oxide adduct monomer (d). As for the copolymerization technique, the above-mentioned methods are judiciously used, and the monomer species and amounts thereof in the monomer component and the copolymerization conditions, among others, are adequately selected so that the polycarboxylic acid polymer and the polyhydric alcohol-alkylene oxide adduct may be contained in the product when the cement admixtures in the above form (II-1) are produced, that the polycarboxylic acid polymer resulting from copolymerization using the polyhydric alcohol-alkylene oxide adduct monomer, together with the polyhydric alcohol-alkylene oxide adduct, may be contained in the product when the cement admixtures in the above form (II-2) are produced, or that the polycarboxylic acid polymer resulting from copolymerization using the polyhydric alcohol-alkylene oxide adduct monomer, together with another polycarboxylic acid polymers, may be contained in the product when the cement admixtures in the above form (II-3) are produced.

The cement admixture of the present invention comprises the above-mentioned essential constituents. Such cement admixture comprises an agent capable of being incorporated in cement compositions and like compositions, namely a cement additive, among others. The cement admixture comprising the above-mentioned essential constituents as main components is one of the preferred forms of embodiment of the present invention. The essential constituents according to the present invention are suited for use as the main components of cement additives and they can constitute the cement admixture of the present invention. Such a cement additive is described below.

The above cement additives can be added to cement compositions such as cement paste, mortar, concrete or the like and used. And, they can suitably be used also in ultrahigh strength concrete.

Suitable as the above cement composition are ones in general use which contain cement, water, fine aggregate, coarse aggregate and so on. These may be added with fine powders, such as fly ash, blast-furnace slag, silica fume, and limestone.

The term "ultrahigh strength concrete" means the one generally so called in the field of cement compositions, namely that kind of concrete which, in strength of the hardening products thereof, is comparable to or higher than that of conventional concrete species even when the water/cement ratio is reduced as compared with conventional levels. For example, even when the water/cement ratio is not higher than 25% by mass, further not higher than 20% by mass, in particular not higher than 18% by mass, particularly not higher than 14% by mass, especially about 12% by mass, that kind of concrete shows that level of workability at which any trouble will not arise in ordinary use, and the hardening product shows a compressive strength of not lower than 60 $N/mm^2$, further not lower than 80 $N/mm^2$, further more not lower than 100 $N/mm^2$, in particular not lower than 120 $N/mm^2$, particularly not lower than 160 $N/mm^2$, especially not lower than 200 $N/mm^2$.

Suitable as the above cement are ordinary, high early strength, ultra high early strength, moderate heat, white or like portland cement; and blended portland cement species such as high alumina cement, calucium-alumina cement, portland fly-ash cement, portland blast-furnace slag cement, silica cement and the like. As the formulation amount and the unit water content of said cement per 1 $m^3$ of concrete is, for example, for producing high durability and high strength concrete, the unit water content is preferably 100 to 185 $kg/m^3$ and the water/cement ratio is preferably 10 to 70%. More preferably, the unit water content is 120 to 175 $kg/m^3$, and water/cement ratio is 20 to 65%.

As regards the addition amount of the cement additive to the cement composition, it is preferred that the essential constituents of the above form (I-1) to (I-6) of the present invention, the essential constituents of the above form (II-1) to (II-3), and the essential constituents of the above form (III-1) to (III-3) amount to not less than 0.01% by mass but more than 10% by mass relative to the whole cement mass being taken as 100% by mass. If it is less than 0.01% by mass, insufficient performance characteristics may result. If it exeeds 10% by mass, the economy will be poor. More preferably, it is not less than 0.05% by mass but more than 8% by mass, still more preferably not less than 0.1% by mass but more than 5% by mass.

Said mass percentage values are reduced values of the solid content.

The above cement additive can be used in combinations with any of those cement dispersants which are in general use and well known in the art. As the above cement dispersants, the following are suitable. ligninsulfonates; polyol derivatives; naphthalenesulfonic acid-formaline condensates; melaminesulfonic acid-formaline condensates; polystyrenesulfonic acid salts; aminosulfonic acid compounds such as aminoarylsulfonic acid-phenol-formaldehyde condensates as described in Japanese Kokai Publication Hei-01-113419; cement dispersants comprising, as component (a), a copolymer of a polyalkylene glycol mono(meth)acrylate compound and a (meth)acrylic acid compound and/or a salt of said copolymer, as component (b), a copolymer of a polyalkylene glycol mono(meth)allyl ether compound and maleic anhydride and/or a hydrolyzate of said copolymer and/or a salt thereof and, as component (c), a copolymer of a polyalkylene glycol mono(meth)allyl ether compound and a maleic acid ester of a polyalkylene glycol compound, and/or a salt thereof, as described in Japanese Kokai Publication Hei-07-267705; concrete additives comprising, as component A, a copolymer of a polyalkylene glycol (meth)acrylate and (meth)acrylic acid (or a salt thereof), as component B, a specific polyethylene glycol-polypropylene glycol compound and, as component C, a specific surfactant, as described in JP 2508113; copolymers of polyethylene(propylene) glycol (meth)acrylate or polyethylene(propylene) glycol mono(meth)allyl ether, (meth)allylsulfonic acid (or a salt thereof) and (meth)acrylic acid (or a salt thereof), as described in Japanese Kokai Publication Sho-62-216950;

copolymers of polyethylene(propylene)glycol(meth)acrylate, (meth)allylsulfonic acid (or a salt thereof) and (meth)acrylic acid (or a salt thereof), as described in Japanese Kokai Publication Hei-01-226757; copolymers of polyethylene(propylene)glycol(meth)acrylate, (meth)allylsulfonic acid (or a salt thereof) or p-(meth)allyloxybenzenesulfonic acid (or a salt thereof) and (meth)acrylic acid (or a salt thereof), as described in Japanese Kokoku Publication Hei-05-36377; copolymers of polyethylene glycol mono(meth)allyl ether and maleic acid (or a salt thereof), as described in Japanese Kokai Publication Hei-04-149056; copolymers of polyethylene glycol(meth)acrylate, (meth)allylsulfonic acid (or a salt thereof), (meth)acrylic acid (or a salt thereof), an alkanediol mono(meth)acrylate, a polyalkylene glycol mono(meth)acrylate and an $\alpha$, $\beta$-unsaturated monomer having an amide group within the molecule, as described in Japanese Kokai Publication Hei-05-170501; copolymers of polyethylene glycol mono(meth)allyl ether, polyethylene glycol mono(meth)acrylate, an alkyl(meth)acrylate, (meth)acrylic acid (or a salt thereof) and (meth)allylsulfonic acid (or a salt thereof) or p-(meth)allyloxybenznesulfonic acid (or a salt thereof), as described in JP Kokai H06-191918; copolymers of an alkoxypolyalkylene glycol monoallyl ether and maleic anhydride, or hydrolyzates thereof, or salts thereof, as described in Japanese Kokai Publication Hei-05-43288; copolymers of polyethylene glycol monoallyl ether, maleic acid and a monomer copolymerizable with these monomers, or salts thereof, or esters thereof, as described in Japanese Kokoku Publication Sho-58-38380;

copolymers of a polyalkylene glycol mono(meth)acrylate monomer, a (meth)acrylic acid monomer and a monomer copolymerizable with these monomers, as described in Japanese Kokoku Publication Sho-59-18338; copolymers of a (meth)acrylic acid ester having a sulfonic acid group and a monomer coplymerizable with these as necessary, or salts thereof, as described in Japanese Kokai Publication Sho-62-119147; esterification reaction products from a copolymer of an alkoxypolyalkylene glycol monoallyl ether and maleic anhydride and an alkenyl-terminated polyoxyalkylene derivative, as described in Japanese Kokai Publication Hei-06-271347; esterification reaction products from a copolymer of an alkoxypolyalkylene glycol monoallyl ether and maleic anhydride and a hydroxy-terminated polyoxyalkylene derivative, as described in Japanese Kokai Publication Hei-06-298555; copolymers of alkenyl ether monomer obtained by addition of an ethylene oxide to a specific unsaturated alcohol, such as 3-methyl-3-buten-1-ol, an unsaturated carboxylic acid monomer and a monomer copolymerizable with these, or salts thereof as described in Japanese Kokai Publication Sho-62-68806 or like polycarboxylic acids (or salts thereof). These cement dispersants may be used singly or two or more of them may be used in combination.

In cases when said cement dispersant is used in combination, the formulation mass amount between the above cement additive and the above cement dispersant is preferably within the range of 5 to 95:95 to 5, more preferably 10 to 90:90 to 10, although it cannot be definitely determined according to the cement dispersant species and mix formulation employed, the test conditions and other factors.

Furthermore, the above cement additives can be used in combination with other cement additives. As said other cement additives, those known other cement additives (admixtures) shown below are suitable.

(1) Water-soluble macromolecular substances; unsaturated carboxylic acid polymers such as polyacrylic acid (sodium salt), polymethacrylic acid (sodium salt), polymaleic acid (sodium salt) and acrylic acid-maleic acid copolymer sodium salt; polyoxyethylene or polyoxypropylene polymers or copolymers thereof, such as polyethylene glycol and polypropylene glycol; nonionic cellulose ethers such as methylcellulose, ethylcellulose, hydroxymethylcellulose, hydroxyethylcellulose, carboxymethylcellulose, carboxyethylcellulose and hydroxypropylcellulose; polysaccharides produced by microbial fermentation, such as yeast glucans, xanthan gum, $\beta$-1,3-glucans (which may be straight chained or branched; e.g. curdlan, paramylum, pachyman, scleroglucan, laminaran); polyacrylamide; polyvinyl alcohol; starch; starch phosphate; sodium alginate; gelatin; amino-containing acrylic acid copolymers and quaternization products derived therefrom; and the like;

(2) Polymer emulsions; copolymers of various vinyl monomers such as alkyl (meth)acrylates; and the like;

(3) Retarders; oxycarboxylic acids (or salts thereof) and inorganic or organic salts, such as gluconic acid, glucoheptonic acid, arabonic acid, malic acid and citric acid, and sodium, potassium, calcium, magnesium, ammonium and triethanolamine salts thereof; saccharides, for example monosaccharides, disaccharides, trisaccharides and like oligosaccharides, such as glucose, fructose, galactose, saccharose, xylose, apiose, ribose and isomerized saccharide, oligosaccharides such as dextrin, polysaccharides such as dextran, molasses and like mixtures containing these; sugar alcohols such as sorbitol; magnesium fluorosilicate; phosphoric acid and salts thereof or borate esters; aminocarboxylic acids and salts thereof; alkali-soluble proteins; humic acid; tannic acid; phenols; polyhydric alcohols such as glycerol; phosphonic acids and derivatives thereof, such as aminotri (methylenephosphonic acid), 1-hydroxyethylidene-1,1-diphosphonic acid, ethylenediaminetetra(methylenephosphonic acid), diethylenetriaminepenta (methylenephosphonic acid) and alkali metal salts and alkaline earth metal salts of these; and the like;

(4) High-early-strength agents or accelerators; soluble calcium salts such as calcium chloride, calcium nitrite, calcium nitrate, calcium bromide and calcium iodide; chlorides such as iron chloride and magnesium chloride; sulfate salts; potassium hydroxide; sodium hydroxide; carbonate salts; thiosulfate salts; formic acid and formate salts such as calcium formate; alkanolamines; alumina cement; calcium aluminosilicate; and the like;

(5) Mineral oil antifoaming agents; kerosene, liquid paraffin, etc.;

(6) Fat or oil antifoaming agents; animal/vegetable oils, sesame oil, castor oil, alkylene oxide adducts derived from these, and the like;

(7) Fatty acid antifoaming agents; oleic acid, stearic acid, alkylene oxide adducts derived from these, and the like;

(8) Fatty acid ester antifoaming agents; glycerin monoricinolate, alkenylsuccinic acid derivatives, sorbitol monolaurate, sorbitol trioleate, natural waxes, etc.;

(9) Oxyalkylene antifoaming agents; polyoxyalkylenes such as (poly)oxyethylene-(poly)oxypropylene adducts; (poly)oxyalkyl ethers such as diethylene glycol heptyl ether, polyoxyethylene oleyl ether, polyoxypropylene butyl ether, polyoxyethylene-polyoxypropylene 2-ethylhexyl ether and oxyethylene-oxypropylene adducts of higher alcohols containing 12 to 14 carbon atoms; (poly)oxyalkylene(alkyl)aryl ethers such as polyoxypropylene phenyl ether and polyoxyethylene nonylphenyl ether; acetylene ethers derived from acetylene alcohol by addition polymerization of an alkylene oxide, such as 2,4,7,9-tetramethyl-5-decyne-4,7-diol, 2,5-dimethyl-3-hexyne-2,5-diol and 3-methyl-1-butyn-3-ol; (poly)oxyalkylene fatty acid esters such as diethylene glycol oleate, diethylene glycol laurate and ethylene glycol distearate; (poly)oxyalkylenesorbitan fatty acid esters such as polyoxyethylenesorbitan monolaurate and polyoxyethylenesorbitan trioleate; (poly)oxyalkylene alkyl(aryl) ether sulfate ester salts such as sodium polyoxypropylenemethyl ether sulfate and sodium polyoxyethylene dodecylphenol ether sulfate; (poly)oxyalkylenealkyl phosphate esters such as (poly)oxyethylenestearyl phosphate; (poly)oxyalkylenealkylamines such as polyoxyethylenelaurylamine; polyoxyalkyleneamides; etc.;

(10) Alcohol antifoaming agents; octyl alcohol, hexadecyl alcohol, acetylene alcohol, glycols, etc.;

(11) Amide antifoaming agents; acrylate polyamines etc.;

(12) Phosphate ester antifoaming agents; tributyl phosphate, sodium octyl phosphate, etc.;

(13) Metal soap antifoaming agents; aluminum stearate, calcium oleate, etc.;

(14) Silicone antifoaming agents; dimethylsilicone oils, silicone pastes, silicone emulsions, organic modified polysiloxanes (polyorganosiloxanes such as dimethylpolysiloxane), fluorosilicone oils, etc.;

(15) AE (air-entraining) agents; resin soaps, saturated or unsaturated fatty acids, sodium hydroxystearate, lauryl sulfate, ABS (alkylbenzenesulfonates), LAS (linear alkylbenzenesulfonates), alkanesulfonates, polyoxyethylene alkyl(phenyl)ethers, polyoxyethylene alkyl(phenyl)ether sulfates and salts thereof, polyoxyethylene alkyl(phenyl)ether phosphates and salts thereof, proteinous materials, alkenylsulfosuccinic acids, α-olefinsulfonates, etc.;

(16) Other surfactants; polyalkylene oxide derivatives produced by addition of not less than 10 moles of an alkylene oxide, such as ethylene oxide and/or propylene oxide to monohydric aliphatic alcohol containing 6 to 30 carbon atoms, such as octadecyl alcohol or stearyl alcohol, a monohydric alicyclic alcohol containing 6 to 30 carbon atoms, such as abietyl alcohol, a monomercaptan containing 6 to 30 carbon atoms, such as dodecyl mercaptan, an alkylphenol containing 6 to 30 carbon atoms, such as nonylphenol, an amine containing 6 to 30 carbon atoms, such as dodecylamine, or a carboxylic acid containing 6 to 30 carbon atoms, such as lauric acid or stearic acid; alkyl diphenyl ether sulfonate salts containing two sulfo-containing phenyl groups, which may have an alkyl or alkoxy group as a substituent, bound together by ether bonding; various anionic surfactants, various cationic surfactants such as alkylamine acetates and alkyltrimethylammonium chlorides; various nonionic surfactants; various amphoteric surfactants; and the like;

(17) Water-proof agents; fatty acids (salts), fatty acid esters, fats and oils, silicones, paraffins, asphalts, waxes, etc.;

(18) Corrosion inhibitors; nitrite salts, phosphate salts, zinc oxide, etc.;

(19) Crack inhibitors; polyoxyalkyl ethers; alkanediols such as 2-methyl-2,4-pentanediol; etc.;

(20) Expansive additives; ettringite materials, coals, etc.

As other known cement additives (admixtures), there may be mentioned cement wetting agents, thickening agents, segregation inhibitors, flocculants, agents to reduce drying shrinkage, agents to increase strength, self-leveling agents, corrosion inhibitors, color difference agents, antifungal agents, blast-furnace slag, fly ash, cinder ash, clinker ash, husk ash, silica fume, silica powder, gypsum and so forth. These known cement additives (admixtures) may be used singly or two or more of them may be used in combination.

The above cement additives may be used in combination not only with the above-mentioned cement dispersants and/or cement additives (admixtures) known in the art but also with additives for improving the dispersibility and/or foaming suppressing ability of cement compositions.

As for the method of adding the above cement additive and the above cement dispersant to a cement composition, it is preferable to mix such cement additive and cement dispersant together to give a cement additive to thereby facilitate the incorporation thereof into the cement composition.

The cement admixture of the present invention can suitably be applied to various cement compositions and the like and, in addition, can provide such a level of viscosity as facilitating the works on the sites of handling them, so that the use of the cement admixture of the present invention leads to improvement in water-reducing ability of cement compositions and to increased strength and durability of hardened products obtained therefrom and, further, to a viscosity that facilitates the works on the sites of handling of cement compositions, whereby the work efficiency in constructing civil engineering and building structures is improved.

BEST MODES FOR CARRYING OUT THE INVENTION

The following examples illustrate the present invention more specifically. They are, however, by no means limitative of the scope of the invention. In the examples, "part(s)" means "part(s) by weight" and "%" denotes "% by mass", unless otherwise specified.

<Evaluation Test 1>

Concrete Test

Concrete formulation was conducted following the unit amount given in concrete formulation A or B in Table 1 below.

TABLE 1

| | Unit weight (kg/m$^3$) | | | | | | W/C. (weight %) | s/a (volume %) |
|---|---|---|---|---|---|---|---|---|
| | Cement | | Water | Fine aggregate | | Coarse aggregate | | |
| Concrete formulation A | *1) | 486 | 170 | *2) | 730.2 | *3) | 909.8 | 35 | 44.1 |
| Concrete formulation B | *1) | 378 | 170 | *2) | 819.3 | *3) | 909.8 | 45 | 47 |

The descriptions in Table 1 are as follows.
1) Cement: Ordinary portland cement (product of Taiheiyo Cement)
2) Fine aggregate: Ohigawa river sand
3) Coarse aggregate: Oume crushed stone "W/C (weight %)" is the weight percentage of water relative to cement and "s/a (volume %) is the volume percentage of the fine aggregate relative to the total aggregate (fine aggregate+coarse aggregate). W is the unit water content, C is the unit cement content, a is the absolute volume of the total aggregate (fine aggregate+coarse aggregate) and s is the absolute volume of fine aggregate.

Under the above-mentioned condition, cement, fine aggregates and coarse aggregates were charged to a 50 L forced action mixer and conducted to dry mixing for 10 seconds. Then, water formulated with the additive was added, and kneading was further performed for 60 seconds to produce concrete. The concrete obtained was measured for slump flow (mortar flow) value and air amount according to the Japanese Industrial Standards (JIS A 1101, 1128, and 6204). The mortar flow value measurement was made by the method described below.

An iron-made hollow cone (hereinafter referred to as "mini-slump cone") having an upper end inside diameter of 5 cm, a lower end inside diameter of 10 cm and a height of 15 cm was placed on a horizontal table and filled to the brim with the cement composition. The filling was carried out according to the method described in JIS A 1101 for the slump test. The mini-slump cone filled with mortar was gently and horizontally taken up, the major diameter and minor diameter of the mortar that had spread on the table were measured, and the mean of the two values was recorded as the mortar flow value. The greater this value is, the better the cement dispersing performance is.

<Evaluation Test 2>

The concrete condition was evaluated as follows.
◉: Very good condition, concrete giving a moist and smooth sense.
○: Good condition, concrete giving no viscous sense.
Δ: Good condition, with some viscousness.
X : No good condition, with viscousness.
XX : Strong viscousness, with a sense of stiffness.

<Evaluation Test 3>

Mortar Performance Evaluation Conditions
Mortar mix
Water: 200 g, standard sand defined in JIS R 5201 (1997): 1,350 g, cement (product of Taiheiyo Cement; ordinary portland cement): 500 g.

Mortar compositions were prepared by adding the respective additives under the above conditions, followed by mixing by the method described in JIS R 5201 (1997) under paragraph 10.4.3, and evaluated for performance.

The mortar condition was evaluated by giving a score between 0 and 10 according to the sensation felt during 10 times of mixing using a mixing spatula in a mixing vessel for mechanical mixing as defined in JIS R 5201 (1997). Thus, the condition was evaluated on a ten-score scale: when the mixing could be performed lightly and the viscosity was low, the condition was good and given a score of 10 and, when the mortar was hard and the viscosity was high, the condition was poor and given a score of 1.

<EXAMPLES>

Production Example 1

A glass-made reaction apparatus equipped with a thermometer, stirrer, dropping device, nitrogen inlet tube and reflux condenser was charged with 661.5 g of water, the reaction apparatus inside was purged with nitrogen with stirring, and the contents were heated to 70° C. in a nitrogen atmosphere. An aqueous monomer solution composed of 711.2 g of methoxypolyethylene glycol monomethacrylate (average molar number of addition of ethylene oxide 10), 188.8 g of methacrylic acid, 225 g of water, and 12.0 g of 3-mercaptopropionic acid as chain transfer agent were added dropwise over 4 hours, and 200 g of a 5.2% aqueous solution of ammonium persulfate was added dropwise over 5 hours to the reaction vessel. After completion of the dripping of the 5.2% aqueous solution of ammonium persulfate, the temperature was further maintained at 70° C. for the succeeding 1 hour to drive the polymerization reaction to completion, and this mixture was neutralized with a 30% aqueous solution of sodium hydroxide to pH 7.0, whereby a polymer aqueous solution 1 (Polymer 1) with a weight average molecular weight of 17,000 was obtained.

Production Example 1'

A glass-made reaction apparatus equipped with a thermometer, stirrer, dropping device, nitrogen inlet tube and reflux condenser was charged with 661.5 g of water, the reaction apparatus inside was purged with nitrogen with stirring, and the contents were heated to 70° C. in a nitrogen atmosphere. An aqueous monomer solution composed of 711.2 g of methoxypolyethylene glycol monoacrylate (average molar number of addition of ethylene oxide 10), 188.8 g of methacrylic acid, 225 g of water, and 12.0 g of 3-mercaptopropionic acid as chain transfer agent were added dropwise over 4 hours, and 200 g of a 5.2% aqueous solution of ammonium persulfate was added dropwise over 5 hours to the reaction vessel. After completion of the dripping of the 5.2% aqueous solution of ammonium persulfate, the temperature was further maintained at 70° C. for the succeeding 1 hour to drive the polymerization reaction to completion, and this mixture was neutralized with a 30% aqueous solution of sodium hydroxide to pH 7.0, whereby a polymer aqueous solution 1' (Polymer 1') with a weight average molecular weight of 17,000 was obtained.

Production Example 2

A glass-made reaction apparatus equipped with a thermometer, stirrer, dropping device, nitrogen inlet tube and reflux condenser was charged with 597.4 g of water, the reaction apparatus inside was purged with nitrogen with stirring, and the contents were heated to 75° C. in a nitrogen atmosphere. An aqueous monomer solution composed of 633.1 g of methoxypolyethylene glycol monomethacrylate (average molar number of addition of ethylene oxide 6), 167.2 g of methacrylic acid, 9.2 g of 3-mercaptopropionic acid, and 165.5 g of water were added dropwise over 5 hours, and 84.0 g of a 11.1% aqueous solution of ammonium persulfate was added dropwise over 6 hours to the reaction vessel. After completion of the dripping of the 11.1% aqueous solution of ammonium persulfate, the temperature was further maintained at 75° C. for the succeeding 1 hour to drive the polymerization reaction to completion, and this mixture was neutralized with a 30% aqueous solution of sodium hydroxide to pH 7.0, whereby a polymer aqueous solution 2 (Polymer 2) with a weight average molecular weight of 15,000 was obtained.

Production Example 3

A glass-made reaction apparatus equipped with a thermometer, stirrer, dropping device, air inlet tube and reflux condenser was charged with 600 g of polyethyleneimine-ethylene oxide adduct (compound obtained by addition of 3 moles, on average, of ethylene oxide to active hydrogen atoms of polyethyleneimine with Mw 600), 0.123 g of methoquinone, and 18.45 g of acetic acid, the temperature was maintained at 90 to 95° C. for 30 minutes. While maintaining the temperature at 90 to 95° C., 47.35 g of glycidyl methacrylate was added dropwise over 60 minutes to the reaction vessel. Thereafter, the temperature was maintained at 90 to 95° C. for 1 hour, then cooled to 65° C., 990.4 g of water and 78.6 g of methacrylic acid were added and pH of this mixture was adjusted to 7.0, whereby a polyethyleneimine-ethylene oxide adduct monomer was synthesized.

Production Example 4

A glass-made reaction apparatus equipped with a thermometer, stirrer, dropping device, nitrogen inlet tube and reflux condenser was charged with 1100 g of water, the reaction apparatus inside was purged with nitrogen with stirring, and the contents were heated to 70° C. in a nitrogen atmosphere. An aqueous monomer solution composed of 1286.3 g of methoxypolyethylene glycol monomethacrylate (average molar number of addition of ethylene oxide 4), 192.2 g of methacrylic acid, 192.9 g of water and 65.6 g of 3-mercaptopropionic acid as chain transfer agent, and 1013 g of the polyethyleneimine-ethylene oxide adduct monomer synthesized in Production Example 3 were respectively added dropwise over 4 hours, and 352 g of a 14.8% aqueous solution of ammonium persulfate was added dropwise over 5 hours to the reaction vessel. After completion of the dripping of the 14.8% aqueous solution of ammonium persulfate, the temperature was further maintained at 70° C. for the succeeding 1 hour to drive the polymerization reaction to completion, and this mixture was neutralized with a 30% aqueous solution of sodium hydroxide to pH 7.0, whereby a polymer aqueous solution 3 (Polymer 3) with a weight average molecular weight of 9,000 was obtained.

Production Example 5

A glass-made reaction apparatus equipped with a thermometer, stirrer, dropping device and reflux condenser was charged with 72.26 parts of deionized water, 127.74 parts of an unsaturated alcohol obtained by addition of 25 moles of ethylene oxide to 3-methyl-3-butene-1-ol, and the contents were heated to 60° C. After addition of 0.90 parts of a 30% aqueous solution of hydrogen peroxide, 20.75 parts of acrylic acid was added dropwise over 3 hours, and an aqueous solution composed of 1.05 parts of 3-mercaptopropionic acid, 0.35 parts of sodium erythorbate and 16.32 parts of deionized water was added dropwise over 3.5 hours. After the temperature was further maintained at 60° C. for the succeeding 60 minutes to drive the polymerization reaction to completion, the mixture was cooled to below 50° C. and this mixture was neutralized with 104.08 parts of 10.0% aqueous solution of sodium hydroxide to pH 4 to 7, whereby a polymer aqueous solution (Polymer A) with a weight average molecular weight of 20,000 was obtained.

Production Example 6

A glass-made reaction apparatus equipped with a thermometer, stirrer, dropping device and reflux condenser was charged with 1200 parts of a polyethyleneimine-ethylene oxide adduct (compound obtained by addition of 3 moles, on average, of ethylene oxide to active hydrogen atoms of polyethyleneimine with Mw 600), 0.25 parts of methoquinone, 37.5 parts of acetic acid were charged and the contents were heated to 90° C. under reflux condensing. After maintaining the temperature at 90° C. for 30 minutes, 94.7 parts of glycidyl methacrylate was added dropwise over 1 hour. After completion of the dripping, this mixture was matured at 90° C. for 1 hour and cooled, whereby polyethyleneimine-ethylene oxide adduct macromer was obtained.

Production Example 7

A glass-made reaction apparatus equipped with a thermometer, stirrer, dropping device, nitrogen inlet tube and reflux condenser was charged with 299 parts of water, the reaction apparatus inside was purged with nitrogen with stirring, and the contents were heated to 70° C. in a nitrogen atmosphere. An aqueous monomer solution composed of 400 parts of methoxypolyethylene glycol monomethacrylate (average molar number of addition of ethylene oxide 6), 106 parts of methacrylic acid, 145 parts of the polyethyleneimine-ethylene oxide adduct macromer of Production Example 6, 28 parts of methyl methacrylate, 20 parts of a 30% sodium hydroxide, 15.5 parts of mercaptopropionic acid and 341 parts of water, 60 parts of a 4.9% aqueous solution of sodium peroxide, and 60 parts of a 6.4% aqueous solution of sodium erythorborate were added dropwise respectively over 4 hours. After completion of the dripping, 15 parts of a 4.9% aqueous solution of hydrogen peroxide and 15 parts of a 6.4% aqueous solution of sodium erythorborate were further added dropwise over 1 hour respectively. After maintaining the temperature at 70° C. for the succeeding 1 hour to drive the polymerization reaction to completion, whereby a polycarboxylic acid copolymer (Polymer 8) with a weight average molecular weight of 10,600 was obtained.

Comparative Production Example 1

A glass-made reaction apparatus equipped with a thermometer, stirrer, dropping device, nitrogen inlet tube and reflux condenser was charged with 333.7 g of water, the reaction apparatus inside was purged with nitrogen with stirring, and the contents were heated to 80° C. in a nitrogen atmosphere. An aqueous monomer solution composed of 375.3 g of methoxypolyethylene glycol monomethacrylate (average molar number of addition of ethylene oxide 25), 74.7 g of methacrylic acid, 112.5 g of water, and 3.8 g of 3-mercaptopropionic acid as chain transfer agent were added dropwise over 4 hours, and 100 g of a 5.2% aqueous solution of ammonium persulfate was added dropwise over 5 hours to the reaction vessel. After completion of the dripping of the 5.2% aqueous solution of ammonium persulfate, the temperature was further maintained at 80° C. for the succeeding 1 hour to drive the polymerization reaction to completion, and this mixture was neutralized with a 30% aqueous solution of sodium hydroxide to pH 7.0, whereby a comparative polymer aqueous solution 1 (Comparative polymer 1) with a weight average molecular weight of 22,000 was obtained.

Comparative Production Example 2

A glass-made reaction apparatus equipped with a thermometer, stirrer, dropping device, nitrogen inlet tube and reflux condenser was charged with 334.7 g of water, the reaction apparatus inside was purged with nitrogen with stirring, and the contents were heated to 80° C. in a nitrogen atmosphere. An aqueous monomer solution composed of 404.0 g of methoxypolyethylene glycol monomethacrylate (average molar number of addition of ethylene oxide 25), 46.0 g of methacrylic acid, 112.5 g of water, and 2.8 g of 3-mercaptopropionic acid as chain transfer agent were added dropwise over 4 hours, and 100 g of a 5.2% aqueous solution of ammonium persulfate was added dropwise over 5 hours to the reaction vessel. After completion of the dripping of the 5.2% aqueous solution of ammonium persulfate, the temperature was further maintained at 80° C. for the succeeding 1 hour to drive the polymerization reaction to completion, and this mixture was neutralized with a 30% aqueous solution of sodium hydroxide to pH 7.0, whereby a polymer aqueous solution 2 (Comparative polymer 2) with a weight average molecular weight of 20,000 was obtained.

Using the material of Concrete formulation A in Table 1, additives were further added. Additives 1 to 5 and the addition amount (reduced amount of solid contents of the additives) relative to 100 parts by weight of cement solid contents were as shown in Table 2.

reflux condenser was charged with 796.7 g of water, the reaction apparatus inside was purged with nitrogen with stirring, and the contents were heated to 70° C. in a nitrogen atmosphere. An aqueous monomer solution composed of 711.2 g of methoxypolyethylene glycol monomethacrylate (average molar number of addition of ethylene oxide 25), 188.8 g of methacrylic acid, 225.0 g of water, and 9.5 g of 3-mercaptopropionic acid as chain transfer agent were added dropwise over 4 hours, and an aqueous solution dissolving 8.3 g of ammonium persulfate in 200.0 g of water was added dropwise over 5 hours to the reaction vessel. After completion

TABLE 2

| | Additive 1 | Addition amount (mass %/C.) | Additive 2 | Addition amount (mass %/C.) | Additive 3 | Addition amount (mass %/C.) | Additive 4 | Addition amount (mass %/C.) | Additive 5 | Addition amount (mass %/C.) |
|---|---|---|---|---|---|---|---|---|---|---|
| Formulation 1 | Polymer 1 | 0.083 | Polymer 2 | 0.169 | Polymer 3 | 0.054 | *6) | 0.054 | MA404 *7) | 0.000033 |
| Formulation 2 | Comparative polymer 1 | 0.17 | Comparative polymer 2 | 0.255 | — | — | — | — | MA303A *8) | 0.01 |
| Formulation 3 | Polymer 1 | 0.16 | — | — | — | — | — | — | MA404 *7) | 0.00002 |
| Formulation 4 | Polymer A | 0.088 | Polymer 2 | 0.175 | Polymer B | 0.070 | *6) | 0.018 | MA404 *7) | 0.000033 |

The descriptions in Table 2 are as follows:
6) is a polyethyleneimine polyethylene oxide adduct (compound obtained by addition of 3 moles, on average, of ethylene oxide to active hydrogen atoms of polyethyleneimine with Mw 600).
7) Additive 5: MA404 is an antifoaming agent manufactured by NMB Company.
8) Additive 5: MA303A is a foaming agent manufactured by NMB Company.

% By mass/C means mass ratio of solid relative to 100% by mass of cement solid content.

According to Evaluation test 1, slump flow value and air amount of the obtained concrete were measured. Further, the conditions of the obtained concrete were evaluated according to Evaluation test 2. Results are shown in Table 3.

of the dripping, the temperature was further maintained at 70° C. for the succeeding 1 hour to drive the polymerization reaction to completion. Successively the temperature was cooled to 40° C., an aqueous solution dissolving 79.2 g of sodium hydroxide in 184.8 g of water was added gradually to neutralize the mixture, whereby a polymer aqueous solution 4 (polymer 4) with a weight average molecular weight of 25,000 was obtained.

Production Example 9

A glass-made reaction apparatus equipped with a thermometer, stirrer, dropping device, nitrogen inlet tube and reflux condenser was charged with 800.1 g of water, the reaction apparatus inside was purged with nitrogen with stirring, and the contents were heated to 70° C. in a nitrogen

TABLE 3

| | Example 1 | | Example 2 | | Comparative Example 1 | | Comparative Example 2 | | Comparative Example 3 | |
|---|---|---|---|---|---|---|---|---|---|---|
| Additive | Formulation 1 | | Formulation 4 | | Formulation 2 | | Formulation 3 | | *9) | |
| Air amount (volume %) | 4.4 | | 4.2 | | 4.4 | | 3.9 | | 4.4 | |
| | Flow value (mm) | Condition of the concrete | Flow value (mm) | Condition of the concrete | Flow value (mm) | Condition of the concrete | Flow value (mm) | Condition of the concrete | Flow value (mm) | Condition of the concrete |
| After 5 minutes | 602 | ○ | 612 | ○ | 645 | x | 526 | x | 645 | ○ |
| After 30 minutes | 615 | ○ | 625 | ○ | 676 | x | 320 | xx | 630 | Δ |
| After 60 minutes | 574 | ○ | 598 | ○ | 683 | x | 250 | xx | 575 | x |
| After 90 minutes | 485 | ○ | 550 | ○~Δ | 620 | x | — | — | 377 | x |

The descriptions in Table 3 are as follows.
9) Additive: SIKAMENT 1100 NT (manufactured by Japan Sika Company) addition amount 0.348% by mass/C, MA303A 0.0014% by mass/C.

Production Example 8

A glass-made reaction apparatus equipped with a thermometer, stirrer, dropping device, nitrogen inlet tube and atmosphere. An aqueous monomer solution composed of 826.8 g of methoxypolyethylene glycol monomethacrylate (average molar number of addition of ethylene oxide 110), 73.2 g of methacrylic acid, 225.0 g of water, and 15.3 g of 3-mercaptopropionic acid as chain transfer agent were added dropwise over 4 hours, and an aqueous solution dissolving 10.4 g of ammonium persulfate in 200.0 g of water was added dropwise over 5 hours to the reaction vessel. After completion of the dripping, the temperature was further maintained at 70°

C. for the succeeding 1 hour to drive the polymerization reaction to completion. Successively the temperature was cooled to 40° C., an aqueous solution dissolving 30.6 g of sodium hydroxide in 184.8 g of water was gradually added to neutralize the mixture, whereby a polymer aqueous solution 5 (Polymer 5) with a weight average molecular weight of 35,000 was obtained.

Production Example 10

A glass-made reaction apparatus equipped with a thermometer, stirrer, dropping device, nitrogen inlet tube and reflux condenser was charged with 810.2 g of water, the reaction apparatus inside was purged with nitrogen with stirring, and the contents were heated to 70° C. in a nitrogen atmosphere. An aqueous monomer solution composed of 826.8 g of methoxypolyethylene glycol monomethacrylate (average molar number of addition of ethylene oxide 150), 73.2 g of methacrylic acid, 225.0 g of water, and 14.8 g of 3-mercaptopropionic acid as chain transfer agent were added dropwise over 4 hours, and an aqueous solution dissolving 10.4 g of ammonium persulfate in 200.0 g of water was added dropwise over 5 hours to the reaction vessel. After completion of the dripping, the temperature was further maintained at 70° C. for the succeeding 1 hour to drive the polymerization reaction to completion. Successively the temperature was cooled to 40° C., an aqueous solution dissolving 30.6 g of sodium hydroxide in 184.8 g of water was gradually added to neutralize the mixture, whereby a polymer aqueous solution 6 (Polymer 6) with a weight average molecular weight of 50,000 was obtained.

According to Evaluation test 3, mortar performance evaluation test was carried out. Results are shown in Table 4.

Furthermore, polymers obtained in Production Examples 8 to 10 and nitrogen atom-containing compound (B) having nom-amide bond are used by previously adding in an amount described in Table 4 to 200 g of water used in the above-mentioned Evaluation test 3.

Addition amount of the polymers and nitrogen atom-containing compound (B) having nom-amide bond relative to 100 parts by weight of cement solid contents are as shown in Table 4, and each of them is represented as % by mass of solid contents. Further, the formulated nitrogen atom-containing compound (B) having nom-amide bond is specifically shown in the following.

The description in Table 4 are as follows.

B—N—1 is a polyethyleneimine polyethylene oxide adduct (compound obtained by addition of 3 moles, on average, of ethylene oxide to active hydrogen atoms of polyethyleneimine with Mw 600).

B—N—2 is a polyethyleneimine polyethylene oxide adduct (compound obtained by addition of 20 moles, on average, of ethylene oxide to active hydrogen atoms of polyethyleneimine with Mw 600).

B—N—3 is polyethyleneimine(average number of molecular weight 1800).

B—N—4 is polyvinylpyrrolidone(average number of molecular weight 10,000).

(A/B) is the mass proportion of the polymer and the compound (B).

(A+B) is the proportion of the sum of the mass of the solid content in the polymer and mass of solid content in the compound (B) added relative to 100 parts by weight of the cement solid content.

The mortar performances shown in Table 4 were evaluated based on the total amounts of addition of the polymer and compound (B) required to attain one and the same mortar flow as measured according to the flow test method described in JIS R 5201 (1997) and on the mortar condition. When the total amount of addition of the polymer and compound (B) is low, this indicates that the cement admixture is excellent in water-reducing ability.

Production Example 11

A glass-made reaction apparatus equipped with a thermometer, stirrer, dropping device, nitrogen inlet tube and reflux condenser was charged with 100.1 g of water, the reaction apparatus inside was purged with nitrogen with stirring, and the contents were heated to 80° C. in a nitrogen atmosphere. An aqueous monomer solution composed of 112.6 g of methoxypolyethylene glycol monoacrylate (average molar number of addition of ethylene oxide 25), 22.4 g of methacrylic acid, 225 g of water, and 1.1 g of 3-mercaptopropionic acid as chain transfer agent were added dropwise over 4 hours, and 30 g of a 5.2% aqueous solution of ammonium persulfate was added dropwise over 5 hours to the reaction vessel. After completion of the dripping of the 5.2% aqueous

TABLE 4

|  | Example 3 | Example 4 | Example 5 | Example 6 | Example 7 | Example 8 | Example 9 | Example 10 | Comparative Example 4 | Comparative Example 5 |
|---|---|---|---|---|---|---|---|---|---|---|
| Polymer 4(mass %/C.) | — | — | — | — | 0.1600 | — | — | — | 0.1600 | — |
| Polymer 5(mass %/C.) | 0.1400 | 0.1300 | 0.1600 | 0.1500 | — | — | 0.1400 | 0.1400 | — | 0.1500 |
| Polymer 6(mass %/C.) | — | — | — | — | — | 0.1200 | — | — | — | — |
| B-N-1(mass %/C.) | 0.0300 | — | 0.0011 | 0.0006 | 0.0100 | 0.0300 | — | — | 0.1600 | — |
| B-N-2(mass %/C.) | — | 0.0300 | — | — | — | — | — | — | — | — |
| B-N-3(mass %/C.) | — | — | — | — | — | — | 0.0300 | — | — | — |
| B-N-4(mass %/C.) | — | — | — | — | — | — | — | 0.0300 | — | — |
| Mortar flow value (mm) | 200 | 195 | 205 | 200 | 190 | 205 | 190 | 200 | 195 | 200 |
| Mortar condition (point) | 9 | 10 | 3 | 2 | 8 | 9 | 10 | 7 | 5 | 1 |
| (A/B) | 4.7 | 4.3 | 145 | 250 | 16 | 4.0 | 4.7 | 4.7 | 1 | — |
| (A + B)(mass %/C.) | 0.1700 | 0.1600 | 0.1611 | 0.1506 | 0.1700 | 0.1500 | 0.1700 | 0.1700 | 0.3200 | 0.1500 | solution of ammonium persulfate, the temperature was further maintained at 80° C. for the succeeding 1 hour to drive the polymerization reaction to completion, and this mixture was neutralized with a 30% aqueous solution of sodium hydroxide to pH 7.0, whereby a polymer aqueous solution 7 (Polymer 7) with a weight average molecular weight of 22,600 was obtained.

Production Example 12

A glass-made reaction apparatus equipped with a thermometer, stirrer, dropping device, nitrogen inlet tube and reflux condenser was charged with 1500 g of polyethyleneimine-ethylene oxide adduct (compound obtained by addition of 3 moles, on average, of ethylene oxide to active hydrogen atoms of polyethyleneimine with Mw 600), 0.3 g of methoquinone, and 45.9 g of acetic acid, the reaction apparatus inside was purged with nitrogen with stirring, and the temperature was maintained at 90 to 95° C. for 30 minutes. While maintaining the temperature at 90° C., 116.3 g of glycidyl methacrylate was added dropwise over 1 hour. After completion of the dripping, stirring was continued for 1 hour at 90° C. 1 hour later, this reaction mixture was cooled to 65° C. and 1662.5 g of water was added, whereby a 50% aqueous solution of polyethyleneimine-ethylene oxide adduct monomer was obtained.

Production Example 13

A glass-made reaction apparatus equipped with a thermometer, stirrer, dropping device, nitrogen inlet tube and reflux condenser was charged with 568.4 g of water, the reaction apparatus inside was purged with nitrogen with stirring, and the contents were heated to 70° C. in a nitrogen atmosphere. An aqueous monomer solution composed of 478.5 g of methoxypolyethylene glycol monomethacrylate (average molar number of addition of ethylene oxide 4), 127.1 g of methacrylic acid, 27.9 g of 3-mercaptopropionic acid as chain transfer agent, and 328.2 g of the 50% aqueous solution of polyethyleneimine-ethylene oxide adduct monomer synthesized in Production Example 12 were respectively added dropwise over 3 hours, and 170 g of a 12% aqueous solution of ammonium persulfate was added dropwise over 4 hours to the reaction vessel. After completion of the dripping of the 12% aqueous solution of ammonium persulfate, the temperature was further maintained at 70° C. for the succeeding 1 hour to drive the polymerization reaction to completion, and the mixture was neutralized with a 30% aqueous solution of sodium hydroxide to pH 7.0, whereby a polymer aqueous solution 8 (Polymer 8)with a weight average molecular weight of 10,900 was obtained.

Production Example 14

A glass-made reaction apparatus equipped with a thermometer, stirrer, dropping device, nitrogen inlet tube, air inlet tube and reflux condenser was charged with 300 parts of a sorbitol ethylene oxide adduct (SB 600: compound obtained by addition of 10 moles, on average, of ethylene oxide to all of active hydrogen atoms (hydroxyl group) of sorbitol, and 0.08 parts of sodium hydroxide, the temperature was raised to 90° C. in an air atmosphere. The reaction apparatus inside was maintained at 90° C., 22.9 parts of glycidyl methacrylate was added over 1 hour. After completion of the addition, the stiring was continued for 2 hours at 90° C., whereby a sorbitol/ethylene oxide adduct monomer (sorbitol EO adduct macromer) was obtained.

Production Example 15

A glass-made reaction apparatus equipped with a thermometer, stirrer, dropping device, nitrogen inlet tube and reflux condenser was charged with 82.5 parts of water, the reaction apparatus inside was purged with nitrogen with stirring, and the contents were heated to 80° C. in a nitrogen atmosphere. An aqueous monomer solution composed of 72.3 parts of methoxypolyethylene glycol monomethacrylate (average molar number of addition of ethylene oxide 25), 22.5 parts of methacrylic acid, 25.2 parts of the sorbitol EO adduct macromer synthesized in Production Example 14, 64.6 parts of water, and 2.88 parts of 3-mercaptopropionic acid as chain transfer agent, and 22.5 parts of a 4.6% aqueous aolution of ammonium persulfate were added dropwise over 3 hours. After completion of the addition, 7.5 parts of a 4.6% aqueous solution of ammonium persulfate was further added dropwise. Thereafter, the temperature was maintained at 80° C. for the succeeding 1 hour to drive the polymerization reaction to completion, whereby a polymer solution 9(Polymer 9) with a weight average molecular weight of 16,300 was obtained.

Production Example 16

A glass-made reaction apparatus equipped with a thermometer, stirrer, dropping device, nitrogen inlet tube and reflux condenser was charged with 600.0 g of diethylenetriamine, 133.1 g of water, 730.9 g of adipic acid was gradually added with stirring, and the reaction temperature was controlled to 150 to 155° C. to remove 300 g of reaction generating water over 9 hours.

Next, 1.7 g of hydroquinone monomethylether, 70.1 g of metacrylic acid was added to remove 3.8 g of reaction generating water. Then, the temperature of this reaction mixture was cooled to 130° C. and 903.4 g of water was added.

To a 3 L autoclave, 1978 g of amidoamine obtained above was added, the inside was purged with nitrogen for three times and warmed to 50° C. The initial pressure was set to $2.026 \times 10^2$ kPa, 564 g of ethylene oxide was fed over 2 hours and 40 minutes. After completion of the feeding, this reaction mixture was matured for 2 hours, whereby 2547 g of pdlyamidopolyamine EO adduct product (PADAEO solution) was obtained.

Production Example 17

A glass-made reaction apparatus equipped with a thermometer, stirrer, dropping device, nitrogen inlet tube and reflux condenser was charged with 700 parts of water, the reaction apparatus inside was purged with nitrogen with stirring, and the contents were heated to 75° C. in a nitrogen atmosphere. An aqueous monomer solution composed of 562.9 parts of methoxypolyethylene glycol monomethacrylate (average molar number of addition of ethylene oxide 4), 149.9 parts of methacrylic acid, 1022.8 parts of water, and 8.8 parts of 3-mercaptopropionic acid as chain transfer agent was added dropwise over 3 hours, 256.0 parts of the aqueous solution of polyamidopolyamine EO adduct of Production Example 16 was added dropwise over 3 hours, and an aqueous solution admixed with 23.4 parts of ammonium persulfate and 276.6 parts of water was added dropwise over 4 hours. Thereafter, the temperature was maintained at 75° C. for the succeeding 1 hour to drive the polymerization reaction to completion, whereby a polymer aqueous solution 10 (Polymer 10) with a weight average molecular weight of 9,200 was obtained.

Using the material of Concrete formulation B in Table 1, additives were further added. Additives 6 to 9 and the addition amount (reduced amount of solid contents of the additives) relative to 100 parts by weight of cement solid contents are as shown in Table 5 and 6.

Slump flow values and air amount of the obtained concrete were measured according to Evaluation test 1. Further, conditions of the obtained concrete were evaluated according to Evaluation test 2. Results are shown in Table 5 and 6.

TABLE 5

| | Additive 6 | Amount of addition (mass %/C.) | mass ratio relative to total of Additive (%) | Additive 7 | Amount of addition (mass %/C.) | mass ratio relative to total of Additive (%) | Additive 8 *10) | Amount of addition (mass %/C.) |
|---|---|---|---|---|---|---|---|---|
| Example11 | Polymer 1 | 0.180 | 45.3 | Polymer 8 | 0.180 | 45.3 | MA404 | 0.0002 |
| Example12 | Polymer 1' | 0.180 | 82.9 | | | | MA404 | 0.0001 |
| Example13 | Polymer 1' | 0.090 | 43.5 | Polymer 7 | 0.080 | 38.6 | MA404 | 0.0001 |
| Example14 | Polymer 1' | 0.160 | 78.0 | Polymer 9*12) | 0.045 | 21.9 | MA404 | 0.0001 |
| Example15 | | | | Polymer 9*12) | 0.500 | 93.1 | MA404 | 0.0001 |
| Example16 | Polymer 1' | 0.160 | 22.5 | Polymer 9*12) | 0.450 | 63.4 | MA404 | 0.0001 |
| Example17 | Polymer 1' | 0.180 | 82.9 | | | | MA404 | 0.0001 |
| Example18 | Polymer 1' | 0.180 | 82.9 | | | | MA404 | 0.0001 |
| Example19 | Polymer 1' | 0.180 | 82.9 | | | | MA404 | 0.0001 |
| Example20 | Polymer 1' | 0.180 | 69.1 | PADAEO | 0.08 | 30.7 | MA404 | 0.0005 |
| Example21 | Polymer 1' | 0.180 | 82.8 | PADAEO | 0.037 | 17.0 | MA404 | 0.0005 |
| Example22 | Polymer 1' | 0.180 | 92.2 | PADAEO | 0.015 | 7.7 | MA404 | 0.0002 |
| Example23 | Polymer 1' | 0.160 | 78.0 | Polymer 10 | 0.045 | 21.9 | MA404 | 0.0002 |
| Example24 | Polymer 1' | 0.160 | 91.3 | Polymer 10 | 0.015 | 8.6 | MA404 | 0.0002 |
| Example25 | Polymer 10 | 0.450 | 84.9 | PADAEO | 0.08 | 15.1 | MA404 | 0.0003 |
| Example26 | Polymer 10 | 0.450 | 91.8 | PADAEO | 0.04 | 8.2 | MA404 | 0.0003 |

| | mass ratio relative to total of Additive (%) | Additive 9 *11) | Amount of addition (mass %/C.) | mass ratio relative to total of Additive (%) | Total of Additives 6 to 9 (mass %/C.) | Slump value (cm) | Air amount (volume %) | Condition of concrete |
|---|---|---|---|---|---|---|---|---|
| Example11 | 0.0 | E63 | 0.037 | 9.3 | 0.3972 | 21.0 | 4.1 | ○ |
| Example12 | 0.0 | SB600 | 0.037 | 17.0 | 0.2171 | 20.0 | 4.6 | ○ |
| Example13 | 0.0 | SB600 | 0.037 | 17.9 | 0.2071 | 20.5 | 4.8 | ○ |
| Example14 | 0.0 | | | | 0.2051 | 20.5 | 4.4 | ○ |
| Example15 | 0.0 | SB600 | 0.037 | 6.9 | 0.5371 | 19.5 | 4.9 | ○ |
| Example16 | 0.0 | SB600 | 0.100 | 14.1 | 0.7101 | 21.0 | 4.7 | ◎ |
| Example17 | 0.0 | SB1200 | 0.037 | 17.0 | 0.2171 | 20.0 | 4.3 | ◎ |
| Example18 | 0.0 | PG10 | 0.037 | 17.0 | 0.2171 | 20.0 | 4.4 | ○ |
| Example19 | 0.0 | TEP20 | 0.037 | 17.0 | 0.2171 | 20.0 | 5.2 | x~Δ |
| Example20 | 0.2 | | | | 0.2605 | 21.5 | 4.0 | ◎ |
| Example21 | 0.2 | | | | 0.2175 | 21.5 | 3.5 | ○ |
| Example22 | 0.1 | | | | 0.1952 | 21.0 | 4.0 | Δ |
| Example23 | 0.1 | | | | 0.2052 | 20.0 | 4.1 | ○ |
| Example24 | 0.1 | | | | 0.1752 | 19.5 | 4.2 | x~Δ |
| Example25 | 0.1 | | | | 0.5303 | 17.5 | 4.6 | ○ |
| Example26 | 0.1 | | | | 0.4903 | 17.0 | 4.7 | Δ |

TABLE 6

| | Additive 6 | Amount of addition (mass %/C.) | mass ratio relative to total of Additive (%) | Additive 7 | Amount of addition (mass %/C.) | mass ratio relative to total of Additive (%) | Additive 8 *10) | Amount of addition (mass %/C.) |
|---|---|---|---|---|---|---|---|---|
| Comparative Example 6 | Polymer 1 | 0.180 | 99.9 | | | | MA404 | 0.0001 |
| Comparative Example 7 | Polymer 1 | 0.150 | 99.4 | | | | MA303 | 0.00095 |
| Comparative Example 8 | Polymer 1' | 0.180 | 99.9 | | | | MA404 | 0.0001 |
| Comparative Example 9 | Polymer 7 | 0.150 | 99.4 | | | | MA303 | 0.00095 |
| Comparative Example 10 | Polymer 1' | 0.180 | 82.9 | | | | MA404 | 0.0001 |
| Comparative Example 11 | Polymer 10 | 0.450 | 99.9 | | | | MA404 | 0.0003 |

TABLE 6-continued

| | mass ratio relative to total of Additive (%) | Additive 9 *11) | Amount of addition (mass %/C.) | mass ratio relative to total of Additive (%) | Total of Additives 6 to 9 (mass %/C.) | Slump value (cm) | Air amount (volume %) | Condition of concrete |
|---|---|---|---|---|---|---|---|---|
| Comparative Example 6 | 0.1 | | | | 0.1801 | 20.5 | 5.1 | x |
| Comparative Example 7 | 0.6 | | | | 0.15095 | 19.0 | 4.6 | x |
| Comparative Example 8 | 0.1 | | | | 0.1801 | 20.5 | 5.1 | x |
| Comparative Example 9 | 0.6 | | | | 0.15095 | 19.0 | 4.6 | x |
| Comparative Example 10 | 0.0 | PEG3000 | 0.037 | 17.0 | 0.2171 | 20.0 | 4.7 | x |
| Comparative Example 11 | 0.1 | | | | 0.4503 | 17.0 | 4.7 | x |

The descriptions in Table 5 and 6 are as follows:
10) Additive 8: MA 404 is an antiforming agent manufactured by NMB company (trademark: MICROAIR 404). MA303 is an AE agent manufactured by NMB company (trademark: MICROAIR 303).
11) Additive 9: E63 is a compound obtained by addition of 3 moles of ethylene oxide to all of active hydrogen of polyethyleneimine having a molecular weight of 600.
SB600 is a compound obtained by addition of 10 moles of ethylene oxide to all of active hydrogen atoms of sorbitol.
SB1200 is a compound obtained by addition of 20 moles of ethylene oxide to all of active hydrogen atoms of sorbitol.
PG10 is a compound obtained by addition of 10 moles of ethylene oxide to all of active hydrogen atoms of polyglycerine (n=4).
TEP20 is a compound obtained by addition of 20 moles of ethylene oxide to all of active hydrogen atoms of trimethylolpropane.
PEG3000 is polyethyleneglycol having a molecular weight of 3000.
Additive 7: Polymer 9*[12]: A polymer obtained by copolymerization of the above-mentioned SB600 after being monomerized.
PADAEO is the polyamidopolyamine EO adduct produced in Production Example 16.

The condition of the concrete composition in which the compound resulting from addition of 3 moles of ethylene oxide to each active hydrogen of polyethyleneimine or the polycarboxylic acid polymer resulting from copolymerization using that compound was used in combination of the cement dispersant, the condition of the concrete composition in which the polyhydric alcohol-EO adduct was used in combination with the cement dispersant, and the condition of the concrete composition in which the polyamidepolyamine-EO adduct (polyamidepolyamine) was used in combination with the cement dispersant were all good, having a moist feel and smooth feel. However, the concrete compositions of Comparative Examples 6 to 11 in which the cement dispersant was used without the combined use of the compound resulting from addition of 3 moles of ethylene oxide to each active hydrogen of polyethyleneimine or the polycarboxylic acid polymer resulting from copolymerization using that compound, or the polyhydric alcohol-EO adduct, or the polyamidepolyamine-EO adduct were viscous and sticky and thus in a poor condition.

INDUSTRIAL APPLICABILITY

The cement admixture of the present invention, which has the constitution described hereinabove, can improve the water-reducing ability of cement pastes, mortar, concrete and other cement compositions, among others, and provide hardening products therefrom with excellent strength and durability characteristics and, in addition, can reduce the viscosity of such a cement composition to a level at which the works at the site of handling the same is facilitated, so that it can improve the work efficiency, among others, in the constructing civil engineering and building structures and the like excellent in basic performance characteristics.

The present application claims priority under 35 U.S.C. §119 to Japanese Patent Application No.2002-100429, filed Apr. 2, 2002, entitled "IONIC CONDUCTORS IN WHICH THE NOVEL MOLTEN SALT IS USED."

The contents of these applications are incorporated herein by reference in their entirety.

The invention claimed is:

1. An admixture for cement, comprising a polycarboxylic acid polymer and a compound containing a nitrogen atom, but not containing an amide bond,
   wherein the mass ratio (A/B) satisfies the relation 200>(A/B)>2,
   where A is the mass of said polycarboxylic acid polymer and B is the mass of said compound containing a nitrogen atom, but not containing an amide bond, and
   wherein the compound containing a nitrogen atom, but not containing an amide bond contains a polyalkyleneimine-alkylene oxide adduct, and
   wherein the polyalkyleneimine-alkylene oxide adduct has a group or groups composed of oxyalkylene unit(s) resulting from addition of one or more species of alkylene oxide(s) and the average molar number of addition of the oxyalkylene unit(s) in each oxyalkylene group of the polyalkyleneimine-alkylene oxide adduct is not less than 3, and
   wherein the polyalkyleneimine-alkylene oxide adduct contains 50 to 100 mole % of oxyethylene units relative to 100 mole % of all the oxyalkylene units, and
   the polycarboxylic acid polymer is the polymer resulting from the copolymerization of a monomer component comprising a polyalkylene glycol unsaturated monomer and an unsaturated carboxylic acid monomer, and wherein the polyalkyleneimine-alkylene oxide adduct is obtained by addition of oxyalkylene group(s) to polyethyleneimine with a weight average molecular weight of 600 to 100,000.

2. The admixture for cement according to claim 1, wherein said polycarboxylic acid polymer has a moiety represented by the following formula (1):

   (1)

wherein $R^1$ represents a hydrogen atom or a hydrocarbon group containing 1 to 20 carbon atoms, $R^a$ may be the same or different and each represents an alkylene group containing 2 to 18 carbon atoms, and r represents the average molar number of addition of the oxyalkylene group represented by $R^aO$ and is a number of from 40 to 300.

3. The admixture for cement according to claim 1, wherein the mass ratio (A/B) satisfies the relation 200>(A/B)>4.

4. The admixture for cement according to claim 1, wherein the polyalkyleneimine-alkylene oxide adduct contains not less than 70 mole % of oxyethylene units relative to 100 mole % of all the oxyalkylene units.

5. The admixture for cement according to claim 1, wherein the average number of polymerization of the alkyleneimine in each polyalkyleneimine chain is up to 300.

6. The admixture for cement according to claim 1, wherein the polyalkyleneimine-alkylene oxide adduct has a weight average molecular weight of up to 50,000.

7. The admixture for cement according to claim 1, wherein the mass ratio (A/B) satisfies the relation 200>(A/B)≧4.

* * * * *